US007649903B2

(12) United States Patent
Dropps et al.

(10) Patent No.: US 7,649,903 B2
(45) Date of Patent: Jan. 19, 2010

(54) METHOD AND SYSTEM FOR MANAGING TRAFFIC IN FIBRE CHANNEL SYSTEMS

(75) Inventors: Frank R. Dropps, Maple Grove, MN (US); Craig M. Verba, Maple Grove, MN (US); Gary M. Papenfuss, St. Paul, MN (US); Ernest G Kohlwey, Eagan, MN (US); Mark A. Owen, Apple Valley, MN (US)

(73) Assignee: QLOGIC, Corporation, Aliso Viejo, CA (US)

( * ) Notice: Subject to any disclaimer, the term of this patent is extended or adjusted under 35 U.S.C. 154(b) by 22 days.

(21) Appl. No.: 12/189,497

(22) Filed: Aug. 11, 2008

(65) Prior Publication Data

US 2009/0041029 A1 Feb. 12, 2009

Related U.S. Application Data

(63) Continuation of application No. 10/894,579, filed on Jul. 20, 2004, now Pat. No. 7,430,175.

(60) Provisional application No. 60/503,812, filed on Sep. 19, 2003, provisional application No. 60/537,933, filed on Jan. 21, 2004, provisional application No. 60/488,757, filed on Jul. 21, 2003, provisional application No. 60/532,965, filed on Dec. 29, 2003, provisional application No. 60/504,038, filed on Sep. 19, 2003, provisional application No. 60/495,212, filed on Aug. 14, 2003, provisional application No. 60/495,165, filed on Aug. 14, 2003, provisional application No. 60/503,809, filed on Sep. 19, 2003, provisional application No. 60/505,381, filed on Sep. 23, 2003, provisional application No. 60/505,195, filed on Sep. 23, 2003, provisional application No. 60/557,613, filed on Mar. 30, 2004, provisional application No. 60/505,075, filed on Sep. 23, 2003, provisional application No. 60/504,950, filed on Sep. 19, 2003, provisional application No. 60/532,967, filed on Dec. 29, 2003, provisional application No. 60/532,966, filed on Dec. 29, 2003, provisional application No. 60/550, 250, filed on Mar. 4, 2004, provisional application No. 60/569,436, filed on May 7, 2004, provisional application No. 60/572,197, filed on May 18, 2004, provisional application No. 60/532,963, filed on Dec. 29, 2003.

(51) Int. Cl.
*H04L 12/56* (2006.01)
(52) U.S. Cl. .................................... 370/419; 370/238
(58) Field of Classification Search .................. 370/229, 370/230, 230.1, 235, 389, 412, 419, 429
See application file for complete search history.

(56) References Cited

U.S. PATENT DOCUMENTS 4,258,418 A 3/1981 Heath (Continued)

FOREIGN PATENT DOCUMENTS

WO  WO-01/95566  12/2001

OTHER PUBLICATIONS

"Final Office Action from USPTO dated Apr. 1, 2008 for U.S. Appl. No. 10/956,717".

(Continued)

*Primary Examiner*—Kwang B Yao
*Assistant Examiner*—Andrew Lai
(74) *Attorney, Agent, or Firm*—Klein, O'Neill & Singh, LLP

(57) ABSTRACT

Method and system for routing fiber channel frames using a fiber channel switch element is provided. The method includes, inserting a time stamp value in a fiber channel frame that is received at a receive segment of the fibre channel switch element; determining if a timeout occurs after a frame arrives at a receive buffer; and processing the frame if the timeout occurred. The method also includes, determining if a delta time value, which provides an accumulated wait time for a frame, is present in frame data; subtracting the delta time stamp value from a global time stamp value and using the resulting time stamp value to determine frame timeout status in the fiber channel switch element. A timeout checker circuit declares a timeout after comparing a time stamp value that is inserted in a fiber channel frame with a programmed time out value and a global counter value.

12 Claims, 13 Drawing Sheets

U.S. PATENT DOCUMENTS

| | | | |
|---|---|---|---|
| 4,344,132 A | 8/1982 | Dixon et al. | |
| 4,691,296 A | 9/1987 | Struger | |
| 4,716,561 A | 12/1987 | Angell et al. | |
| 4,860,193 A | 8/1989 | Bentley et al. | |
| 4,964,119 A | 10/1990 | Endo et al. | |
| 5,025,370 A | 6/1991 | Koegel et al. | |
| 5,151,899 A | 9/1992 | Thomas et al. | |
| 5,258,751 A | 11/1993 | DeLuca et al. | |
| 5,260,935 A | 11/1993 | Turner | |
| 5,280,483 A | 1/1994 | Kamoi et al. | |
| 5,291,481 A | 3/1994 | Doshi et al. | |
| 5,425,022 A | 6/1995 | Clark et al. | |
| 5,537,400 A | 7/1996 | Diaz et al. | |
| 5,568,167 A | 10/1996 | Galbi et al. | |
| 5,579,443 A | 11/1996 | Tatematsu et al. | |
| 5,594,672 A | 1/1997 | Hicks | |
| 5,638,518 A | 6/1997 | Malladi | |
| 5,677,909 A | 10/1997 | Heide | |
| 5,751,710 A | 5/1998 | Crowther et al. | |
| 5,757,771 A | 5/1998 | Li et al. | |
| 5,764,927 A | 6/1998 | Murphy et al. | |
| 5,768,271 A | 6/1998 | Seid et al. | |
| 5,768,533 A | 6/1998 | Ran | |
| 5,784,358 A | 7/1998 | Smith et al. | |
| 5,790,545 A | 8/1998 | Holt et al. | |
| 5,822,300 A | 10/1998 | Johnson et al. | |
| 5,835,748 A | 11/1998 | Orenstein et al. | |
| 5,892,604 A | 4/1999 | Yamanaka et al. | |
| 5,925,119 A | 7/1999 | Maroney | |
| 5,936,442 A | 8/1999 | Liu et al. | |
| 5,974,547 A | 10/1999 | Klimenko | |
| 6,009,226 A | 12/1999 | Tsuji et al. | |
| 6,011,779 A | 1/2000 | Wills | |
| 6,046,979 A | 4/2000 | Bauman | |
| 6,118,791 A | 9/2000 | Fichou et al. | |
| 6,131,123 A | 10/2000 | Hurst et al. | |
| 6,134,127 A | 10/2000 | Kirchberg | |
| 6,147,976 A | 11/2000 | Shand et al. | |
| 6,148,421 A | 11/2000 | Hoese et al. | |
| 6,151,644 A | 11/2000 | Wu | |
| 6,158,014 A | 12/2000 | Henson | |
| 6,185,203 B1 | 2/2001 | Berman | |
| 6,209,089 B1 | 3/2001 | Selitrennikoff et al. | |
| 6,230,276 B1 | 5/2001 | Hayden | |
| 6,278,708 B1 | 8/2001 | Von Hammerstein et al. | |
| 6,286,011 B1 | 9/2001 | Velamuri et al. | |
| 6,301,612 B1 | 10/2001 | Selitrennikoff et al. | |
| 6,307,857 B1 | 10/2001 | Yokoyama et al. | |
| 6,310,884 B1 | 10/2001 | Odenwald, Jr. | |
| 6,311,204 B1 | 10/2001 | Mills | |
| 6,314,477 B1 | 11/2001 | Cowger et al. | |
| 6,333,932 B1 | 12/2001 | Kobayasi et al. | |
| 6,335,935 B2 | 1/2002 | Kadambi et al. | |
| 6,397,360 B1 | 5/2002 | Bruns | |
| 6,404,749 B1 | 6/2002 | Falk | |
| 6,421,342 B1 | 7/2002 | Schwartz et al. | |
| 6,438,628 B1 | 8/2002 | Messerly et al. | |
| 6,480,500 B1 | 11/2002 | Erimli et al. | |
| 6,509,988 B1 | 1/2003 | Saito | |
| 6,522,656 B1 | 2/2003 | Gridley | |
| 6,553,036 B1 | 4/2003 | Miller et al. | |
| 6,563,796 B1 | 5/2003 | Saito | |
| 6,606,690 B2 | 8/2003 | Padovano | |
| 6,622,206 B1 | 9/2003 | Kanamaru et al. | |
| 6,629,161 B2 | 9/2003 | Matsuki et al. | |
| 6,643,298 B1 | 11/2003 | Brunheroto et al. | |
| 6,684,209 B1 | 1/2004 | Ito et al. | |
| 6,697,914 B1 | 2/2004 | Hospodor et al. | |
| 6,700,877 B1 | 3/2004 | Lorenz et al. | |
| 6,765,871 B1 | 7/2004 | Knobel et al. | |
| 6,779,083 B2 | 8/2004 | Ito et al. | |
| 6,865,155 B1 | 3/2005 | Wong et al. | |
| 6,888,831 B1 | 5/2005 | Hospodor et al. | |
| 6,901,072 B1 | 5/2005 | Wong | |
| 6,904,507 B2 | 6/2005 | Gil | |
| 6,922,408 B2 | 7/2005 | Bloch et al. | |
| 6,928,470 B1 | 8/2005 | Hamlin | |
| 6,934,799 B2 | 8/2005 | Acharya et al. | |
| 6,947,393 B2 | 9/2005 | Hooper, III | |
| 6,975,627 B1 | 12/2005 | Parry et al. | |
| 6,983,342 B2 | 1/2006 | Helenic et al. | |
| 6,987,768 B1 | 1/2006 | Kojima et al. | |
| 6,988,130 B2 | 1/2006 | Blumenau et al. | |
| 6,988,149 B2 | 1/2006 | Odenwald | |
| 7,024,410 B2 | 4/2006 | Ito et al. | |
| 7,031,615 B2 | 4/2006 | Gentile | |
| 7,051,182 B2 | 5/2006 | Blumenau et al. | |
| 7,076,569 B1 | 7/2006 | Bailey et al. | |
| 7,082,126 B2 | 7/2006 | Ain et al. | |
| 7,120,728 B2 | 10/2006 | Krakirian et al. | |
| 7,150,021 B1 | 12/2006 | Vajjhala et al. | |
| 7,187,688 B2 | 3/2007 | Garmire et al. | |
| 7,200,610 B1 | 4/2007 | Prawdiuk et al. | |
| 7,209,478 B2 | 4/2007 | Rojas et al. | |
| 7,230,929 B2 | 6/2007 | Betker et al. | |
| 7,233,570 B2 | 6/2007 | Gregg | |
| 7,233,985 B2 | 6/2007 | Hahn et al. | |
| 7,239,641 B1 | 7/2007 | Banks et al. | |
| 7,245,627 B2 | 7/2007 | Goldenberg et al. | |
| 7,263,593 B2 | 8/2007 | Honda et al. | |
| 7,266,286 B2 | 9/2007 | Tanizawa et al. | |
| 7,269,168 B2 | 9/2007 | Roy et al. | |
| 7,277,431 B2 | 10/2007 | Walter et al. | |
| 7,287,063 B2 | 10/2007 | Baldwin et al. | |
| 7,315,511 B2 | 1/2008 | Morita et al. | |
| 7,346,707 B1 | 3/2008 | Erimli | |
| 7,349,399 B1 | 3/2008 | Chen et al. | |
| 7,352,740 B2 | 4/2008 | Hammons et al. | |
| 7,397,788 B2 | 7/2008 | Mies et al. | |
| 7,406,034 B1 | 7/2008 | Cometto et al. | |
| 7,424,533 B1 | 9/2008 | Di Benedetto et al. | |
| 7,443,794 B2 | 10/2008 | George et al. | |
| 7,460,534 B1 | 12/2008 | Ballenger | |
| 7,466,700 B2 | 12/2008 | Dropps et al. | |
| 7,471,691 B2 | 12/2008 | Black et al. | |
| 7,492,780 B1 * | 2/2009 | Goolsby | 370/412 |
| 2001/0033552 A1 | 10/2001 | Barrack et al. | |
| 2001/0043564 A1 | 11/2001 | Bloch et al. | |
| 2002/0118692 A1 | 8/2002 | Oberman et al. | |
| 2002/0122428 A1 | 9/2002 | Fan et al. | |
| 2002/0124102 A1 | 9/2002 | Kramer et al. | |
| 2002/0174197 A1 | 11/2002 | Schimke et al. | |
| 2002/0194294 A1 | 12/2002 | Blumenau et al. | |
| 2003/0002516 A1 | 1/2003 | Boock et al. | |
| 2003/0012200 A1 | 1/2003 | Salamat | |
| 2003/0033487 A1 | 2/2003 | Pfister et al. | |
| 2003/0037159 A1 * | 2/2003 | Zhao et al. | 709/232 |
| 2003/0063567 A1 | 4/2003 | Dehart | |
| 2003/0076788 A1 | 4/2003 | Grabauskas et al. | |
| 2003/0091062 A1 | 5/2003 | Lay et al. | |
| 2003/0093607 A1 | 5/2003 | Main et al. | |
| 2003/0112819 A1 | 6/2003 | Kofoed et al. | |
| 2003/0115355 A1 | 6/2003 | Cometto et al. | |
| 2003/0118053 A1 | 6/2003 | Edsall et al. | |
| 2003/0120743 A1 | 6/2003 | Coatney et al. | |
| 2003/0120791 A1 | 6/2003 | Weber et al. | |
| 2003/0126242 A1 | 7/2003 | Chang | |
| 2003/0131105 A1 | 7/2003 | Czeiger et al. | |
| 2003/0139900 A1 | 7/2003 | Robison | |
| 2003/0152076 A1 * | 8/2003 | Lee et al. | 370/389 |
| 2003/0172149 A1 | 9/2003 | Edsall et al. | |
| 2003/0172239 A1 | 9/2003 | Swank | |
| 2003/0179748 A1 | 9/2003 | George et al. | |
| 2003/0179755 A1 | 9/2003 | Fraser | |

| | | |
|---|---|---|
| 2003/0189935 A1 | 10/2003 | Warden et al. |
| 2003/0198238 A1 | 10/2003 | Westby |
| 2003/0200315 A1 | 10/2003 | Goldenberg et al. |
| 2004/0013088 A1 | 1/2004 | Gregg |
| 2004/0013113 A1 | 1/2004 | Singh et al. |
| 2004/0027989 A1 | 2/2004 | Martin et al. |
| 2004/0042458 A1 | 3/2004 | Elzu |
| 2004/0054776 A1 | 3/2004 | Klotz et al. |
| 2004/0054866 A1 | 3/2004 | Blumenau et al. |
| 2004/0064664 A1 | 4/2004 | Gil |
| 2004/0081196 A1 | 4/2004 | Elliott |
| 2004/0085974 A1 | 5/2004 | Mies et al. |
| 2004/0092278 A1 | 5/2004 | Diepstraten et al. |
| 2004/0107389 A1 | 6/2004 | Brown et al. |
| 2004/0125799 A1 | 7/2004 | Buer |
| 2004/0141518 A1 | 7/2004 | Milligan et al. |
| 2004/0153526 A1 | 8/2004 | Haun et al. |
| 2004/0153566 A1 | 8/2004 | Lalsangi et al. |
| 2004/0153863 A1 | 8/2004 | Klotz et al. |
| 2004/0202189 A1 | 10/2004 | Arndt et al. |
| 2004/0218531 A1 | 11/2004 | Cherian et al. |
| 2005/0025152 A1 | 2/2005 | Georgiou et al. |
| 2005/0036485 A1 | 2/2005 | Eilers et al. |
| 2005/0047334 A1 | 3/2005 | Paul et al. |
| 2005/0099970 A1 | 5/2005 | Halliday |
| 2005/0108444 A1 | 5/2005 | Flauaus et al. |
| 2005/0111845 A1 | 5/2005 | Nelson et al. |
| 2005/0286526 A1 | 12/2005 | Sood et al. |
| 2006/0034302 A1 | 2/2006 | Peterson |
| 2006/0143300 A1 | 6/2006 | See et al. |
| 2006/0274744 A1 | 12/2006 | Nagai et al. |

OTHER PUBLICATIONS

"Office Action from USPTO dated Apr. 3, 2008 for U.S. Appl. No. 10/894,587".
"Notice of Allowance from USPTO dated Apr. 4, 2008 for U.S. Appl. No. 11/608,634".
"Office Action from USPTO dated Apr. 4, 2008 for U.S. Appl. No. 10/957,465".
"Notice of Allowance from USPTO dated Apr. 9, 2008 for U.S. Appl. No. 11/039,189".
"Notice of Allowance from USPTO dated Apr. 10, 2008 for U.S. Appl. No. 10/241,153".
"Office Action from USPTO dated Apr. 11, 2008 for U.S. Appl. No. 10/894,595".
"Office Action from USPTO dated Apr. 14, 2008 for U.S. Appl. No. 10/894,627".
"Office Action from USPTO dated Apr. 16, 2008 for U.S. Appl. No. 10/935,919".
"Office Action from USPTO dated Apr. 17, 2008 for U.S. Appl. No. 10/894,689".
"Notice of Allowance from USPTO dated Apr. 18, 2008 for U.S. Appl. No. 10/894,597".
"Final Office Action from USPTO dated Apr. 23, 2008 for U.S. Appl. No. 10/889,255".
"Final Office Action from USPTO dated Apr. 29, 2008 for U.S. Appl. No. 10/894,491".
"Office Action from USPTO dated May 2, 2008 for U.S. Appl. No. 11/037,922".
"Final Office Action from USPTO dated May 12, 2008 for U.S. Appl. No. 10/894,492".
"Office Action from USPTO dated May 14, 2008 for U.S. Appl. No. 10/956,502".
"Office Action from USPTO dated May 15, 2008 for U.S. Appl. No. 10/798,527".
"Final Office Action from USPTO dated May 21, 2008 for U.S. Appl. No. 10/889,635".
"Office Action from USPTO dated May 27, 2008 for U.S. Appl. No. 10/956,955".
"Final Office Action from USPTO dated Jun. 4, 2008 for U.S. Appl. No. 10/894,978".
"Final Office Action from USPTO dated Jun. 5, 2008 for U.S. Appl. No. 10/889,267".
"Final Office Action from USPTO dated Jun. 10, 2008 for U.S. Appl. No. 10/894,586".
"Office Action from USPTO dated Jun. 25, 2008 for U.S. Appl. No. 10/895,175".
"Notice of Allowance from USPTO dated Jun. 25, 2008 for U.S. Appl. No. 10/894,491".
"Notice of Allowance from USPTO dated Jun. 27, 2008 for U.S. Appl. No. 10/956,717".
"Office Action from USPTO dated Jun. 26, 2008 for U.S. Appl. No. 10/894,547".
"Office Action from USPTO dated Jun. 27, 2008 for U.S. Appl. No. 10/894,726".
"Final Office Action from USPTO dated Jul. 9, 2008 for U.S. Appl. No. 10/894,917".
"Notice of Allowance from USPTO dated Jul. 9, 2008 for U.S. Appl. No. 10/894,629".
"Notice of Allowance from USPTO dated Jul. 17, 2008 for U.S. Appl. No. 10/894,536".
"Office Action from USPTO dated Jul. 25, 2008 for U.S. Appl. No. 10/894,827".
"Office Action from State Intellectual Property Office (SIPO) of China for Chinese application 200580032889.0".
"Final Office Action from USPTO Dated Aug. 4, 2008 for U.S. Appl. No. 10/894,732".
"Notice of Allowance from USPTO dated Aug. 18, 2008 for U.S. Appl. No. 10/889,259".
"Final Office Action from USPTO dated Aug. 20, 2008 for U.S. Appl. No. 10/798,468".
"Office Action from USPTO dated Sep. 18, 2008 for U.S. Appl. No. 10/894,978".
"Office Action from USPTO dated Sep. 23, 2008 for U.S. Appl. No. 12/031,585".
"Notice of Allowance from the USPTO dated Sep. 29, 2008 for U.S. Appl. No. 10/889,267".
"Final Office Action from USPTO dated Oct. 8, 2008 for U.S. Appl. No. 11/057,912".
"Non-Final Office Action from USPTO dated Oct. 10, 2008 for U.S. Appl. No. 10/894,627".
"Notice of Allowance from USPTO dated Oct. 8, 2008 for U.S. Appl. No. 10/889,255".
"Notice of Allowance from USPTO dated Oct. 8, 2008 for U.S. Appl. No. 10/798,527".
"Notice of Allowance from USPTO dated Oct. 15, 2008 for U.S. Appl. No. 10/894,492".
"Final Office Action from USPTO dated Oct. 17, 2008 for U.S. Appl. No. 10/894,595".
"Final Office Action from USPTO dated Nov. 13, 2008 for U.S. Appl. No. 10/894,587".
"Office Action from USPTO dated Nov. 13, 2008 for U.S. Appl. No. 10/894,917".
"Office Action from USPTO dated Nov. 26, 2008 for U.S. Appl. No. 10/956,502".
"Office Action from USPTO dated Nov. 26, 2008 for U.S. Appl. No. 10/894,547".
"Final Office Action from USPTO dated Dec. 24, 2008 for U.S. Appl. No. 10/894,726".
"Office Action from USPTO dated Dec. 23, 2008 for U.S. Appl. No. 10/798,468".
"Notice of Allowance from USPTO dated Dec. 30, 2008 for U.S. Appl. No. 11/037,922".
"Final Office Action from USPTO dated Jan. 21, 2009 for U.S. Appl. No. 10/894,827".
"Office Action from USPTO dated Jan. 17, 2009 for U.S. Appl. No. 10/894,586".
"Final Office Action from USPTO dated Jan. 26, 2009 for U.S. Appl. No. 10/895,175".
"Notice of Allowance from USPTO dated Feb. 10, 2009 for U.S. Appl. No. 10/894,595".
"Office Action from USPTO dated Feb. 17, 2009 for U.S. Appl. No. 10/894,732".

"Notice of Allowance from USPTO dated Feb. 25, 2009 for U.S. Appl. No. 10/894,827".
"Notice of Allowance from USPTO dated Feb. 27, 2009 for U.S. Appl. No. 10/895,175".
"Notice of Allowance from USPTO dated Mar. 6, 2009 for U.S. Appl. No. 10/956,502".
"Office Action from USPTO dated Mar. 9, 2009 for U.S. Appl. No. 11/057,912".
"Notice of Allowance from USPTO dated Mar. 9, 2009 for U.S. Appl. No. 10/889,635".
"Office Action from USPTO dated Mar. 16, 2009 for U.S. Appl. No. 10/956,501".
"Notice of Allowance from USPTO dated Mar. 20, 2009 for U.S. Appl. No. 10/894,978".
"Notice of Allowance from USPTO dated Mar. 23, 2009 for U.S. Appl. No. 12/198,644".
"Office Action from USPTO dated Mar. 25, 2009 for U.S. Appl. No. 10/894,546".
"Notice of Allowance from USPTO dated Mar. 31, 2009 for U.S. Appl. No. 12/031,585".
"Office Action from USPTO dated Apr. 2, 2009 for U.S. Appl. No. 10/889,256".
"Examination Report from European Patent Office dated Mar. 27, 2009 for European Application No. 05798761.2".
"Notice of Allowance from USPTO dated May 5, 2009 for U.S. Appl. No. 10/798,468".
"Office Action from USPTO dated May 14, 2009 for U.S. Appl. No. 11/682,199".
"Notice of Allowance from USPTO dated May 18, 2009 for U.S. Appl. No. 10/894,917".
"Notice of Allowance from USPTO dated May 26, 2009 for U.S. Appl. No. 10/894,627".
"Office Action from USPTO dated Jun. 25, 2009 for U.S. Appl. No. 10/894,547".
"Notice of Allowance from USPTO dated Jul. 6, 2009 for U.S. Appl. No. 10/894,587".
"Notice of Allowance from USPTO dated Jul. 9, 2009 for U.S. Appl. No. 10/894,726".
"Office Action from USPTO dated Jul. 23, 2009 for U.S. Appl. No. 10/894,732".
"Office Action from Chinese State Intellectual Property Office dated Jul. 10, 2009 for Chinese Application No. 200580032888.6".
"Office Action dated Jun. 19, 2009 from State Intellectual Property Office for Chinese Application No. 200580032948.4".
"Office Action from USPTO dated Sep. 8, 2009 for U.S. Appl. No. 11/743,852".
"Final Office Action from USPTO dated Sep. 15, 2009 for U.S. Appl. No. 10/956,501".
"Office Action from USPTO dated Sep. 25, 2009 for U.S. Appl. No. 11/682,199".
"Final Office Action from USPTO dated Oct. 26, 2009 for U.S. Appl. No. 10/894,546".

* cited by examiner

METHOD AND SYSTEM FOR MANAGING TRAFFIC IN FIBRE CHANNEL SYSTEMS

CROSS REFERENCE TO RELATED APPLICATIONS

This application is a continuation of U.S. application Ser. No. 10/894,579, filed Jul. 20, 2004, now U.S. Pat. No. 7,430,175, the '579 application claims priority under 35 U.S.C. § 119(e)(1) to the following provisional patent applications:

Filed on Sep. 19, 2003, Ser. No. 60/503,812, entitled "Method and System for Fibre Channel Switches";

Filed on Jan. 21, 2004, Ser. No. 60/537,933 entitled "Method And System For Routing And Filtering Network Data Packets In Fibre Channel Systems";

Filed on Jul. 21, 2003, Ser. No. 60/488,757, entitled "Method and System for Selecting Virtual Lanes in Fibre Channel Switches"; Filed on Dec. 29, 2003, Ser. No. 60/532,965, entitled "Programmable Pseudo Virtual Lanes for Fibre Channel Systems";

Filed on Sep. 19, 2003, Ser, No. 60/504,038, entitled "Method and System for Reducing Latency and Congestion in Fibre Channel Switches;

Filed on Aug. 14, 2003, Ser. No. 60/495,212, entitled "Method and System for Detecting Congestion and Over Subscription in a Fibre channel Network"; Filed on Aug. 14, 2003, Ser. No. 60/495,165, entitled "LUN Based Hard Zoning in Fibre Channel Switches";

Filed on Sep. 19, 2003, Ser. No. 60/503,809, entitled "Multi Speed Cut Through Operation in Fibre Channel Switches"; Filed on Sep. 23, 2003, Ser. No. 60/505,381, entitled "Method and System for Improving bandwidth and reducing Idles in Fibre Channel Switches";

Filed on Sep. 23, 2003, Ser. No. 60/505,195, entitled "Method and System for Keeping a Fibre Channel Arbitrated Loop Open During Frame Gaps";

Filed on Mar. 30, 2004, Ser. No. 60/557,613, entitled "Method and System for Congestion Control based on Optimum Bandwidth Allocation in a Fibre Channel Switch";

Filed on Sep. 23, 2003, Ser. No. 60/505,075, entitled "Method and System for Programmable Data Dependent Network Routing";

Filed on Sep. 19, 2003, Ser. No. 60/504,950, entitled "Method and System for Power Control of Fibre Channel Switches";

Filed on Dec. 29, 2003, Ser. No. 60/532,967, entitled "Method and System for Buffer to Buffer Credit recovery in Fibre Channel Systems Using Virtual and/or Pseudo Virtual Lane";

Filed on Dec. 29, 2003, Ser. No. 60/532,966, entitled "Method And System For Using Extended Fabric Features With Fibre Channel Switch Elements"; Filed on Mar. 4, 2004, Ser. No. 60/550,250, entitled "Method And System for Programmable Data Dependent Network Routing";

Filed on May 7, 2004, Ser. No. 60/569,436, entitled "Method And System For Congestion Control In A Fibre Channel Switch";

Filed on May 18, 2004, Ser. No. 60/572,197, entitled "Method and System for Configuring Fibre Channel Ports" and Filed on Dec. 29, 2003, Ser. No. 60/532,963 entitled "Method and System for Managing Traffic in Fibre Channel Switches".

The disclosure of the foregoing applications is incorporated herein by reference in their entirety.

BACKGROUND

1. Field of the Invention

The present invention relates to fibre channel systems, and more particularly, to determining frame time out to minimize frame latency and reduce congestion.

2. Background of the Invention

Fibre channel is a set of American National Standard Institute (ANSI) standards, which provide a serial transmission protocol for storage and network protocols such as HIPPI, SCSI, IP, ATM and others. Fibre channel provides an input/output interface to meet the requirements of both channel and network users.

Fibre channel supports three different topologies: point-to-point, arbitrated loop and fibre channel fabric. The point-to-point topology attaches two devices directly. The arbitrated loop topology attaches devices in a loop.

The fibre channel fabric topology attaches host systems directly to a fabric, which are then connected to multiple devices. The fibre channel fabric topology allows several media types to be interconnected.

Fibre channel is a closed system that relies on multiple ports to exchange information on attributes and characteristics to determine if the ports can operate together. If the ports can work together, they define the criteria under which they communicate.

In fibre channel, a path is established between two nodes where the path's primary task is to transport data from one point to another at high speed with low latency, performing only simple error detection in hardware.

Fibre channel fabric devices include a node port or "N_Port" that manages fabric connections. The N_port establishes a connection to a fabric element (e.g., a switch) having a fabric port or F_port. Fabric elements include the intelligence to handle routing, error detection, recovery, and similar management functions.

A fibre channel switch is a multi-port device where each port manages a simple point-to-point connection between itself and its attached system. Each port can be attached to a server, peripheral, I/O subsystem, bridge, hub, router, or even another switch. A switch receives messages from one port and automatically routes it to another port. Multiple calls or data transfers happen concurrently through the multi-port fibre channel switch.

Fibre channel switches use memory buffers to hold frames received and sent across a network. Associated with these buffers are credits, which are the number of frames that a buffer can hold per fabric port.

Frames enter a fabric switch element at a given time, but for whatever reason may be stalled in the switch element. This can cause congestion and frame latency causing degradation in the overall performance of the network.

A fibre channel fabric is required to either deliver or discard a frame within certain duration, known as RA_TOV (per fibre channel standard, FC-FS). Error recovery procedures depend on this aspect. Conventional fibre channel switch elements do not know how long a frame has taken to traverse other switch elements in the fabric before arriving at a local switch element.

Therefore, what is required is a method and system for switch elements to track the total time a frame has been in the fabric and declare a time-out if the frame has not been delivered/processed in time.

SUMMARY OF THE PRESENT INVENTION

In one aspect of the present invention, a method for routing fibre channel frames using a fibre channel switch element is provided. The method includes, inserting a time stamp value in a fibre channel frame that is received at a receive segment of the fibre channel switch element; determining if a timeout occurs after a frame arrives at a receive buffer; and processing the frame if the timeout occurred.

The method also includes, determining if a delta time value, which provides an accumulated wait time for a frame, is present in frame data; subtracting the delta time stamp value from a global time stamp value and using the resulting time stamp value to determine frame timeout status in the fibre channel switch element.

In another aspect of the present invention, a fibre channel switch element for routing fibre channel frames is provided. The fibre channel switch element includes a receive and transmit segment for receiving and transmitting fibre channel frames, wherein the receive and transmit segments include a timeout checker circuit that declares a timeout after comparing a time stamp value that is inserted in a fibre channel frame with a programmed time out value and a global counter value. The programmed time out value is used to declare a major or minor timeout.

Also, a fibre channel frame received by the receive segment includes a delta time value, which specifies an accumulated elapsed time for a frame in transit. If an incoming frame includes the delta time feature then the delta time value is subtracted from the global counter value, wherein the result of the subtraction becomes the delta time value for the frame when the frame moves from the receive segment to the transmit segment.

This brief summary has been provided so that the nature of the invention may be understood quickly. A more complete understanding of the invention can be obtained by reference to the following detailed description of the preferred embodiments thereof concerning the attached drawings

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures.

DETAILED DESCRIPTION OF THE PREFERRED EMBODIMENTS

Definitions

Figure 1A:
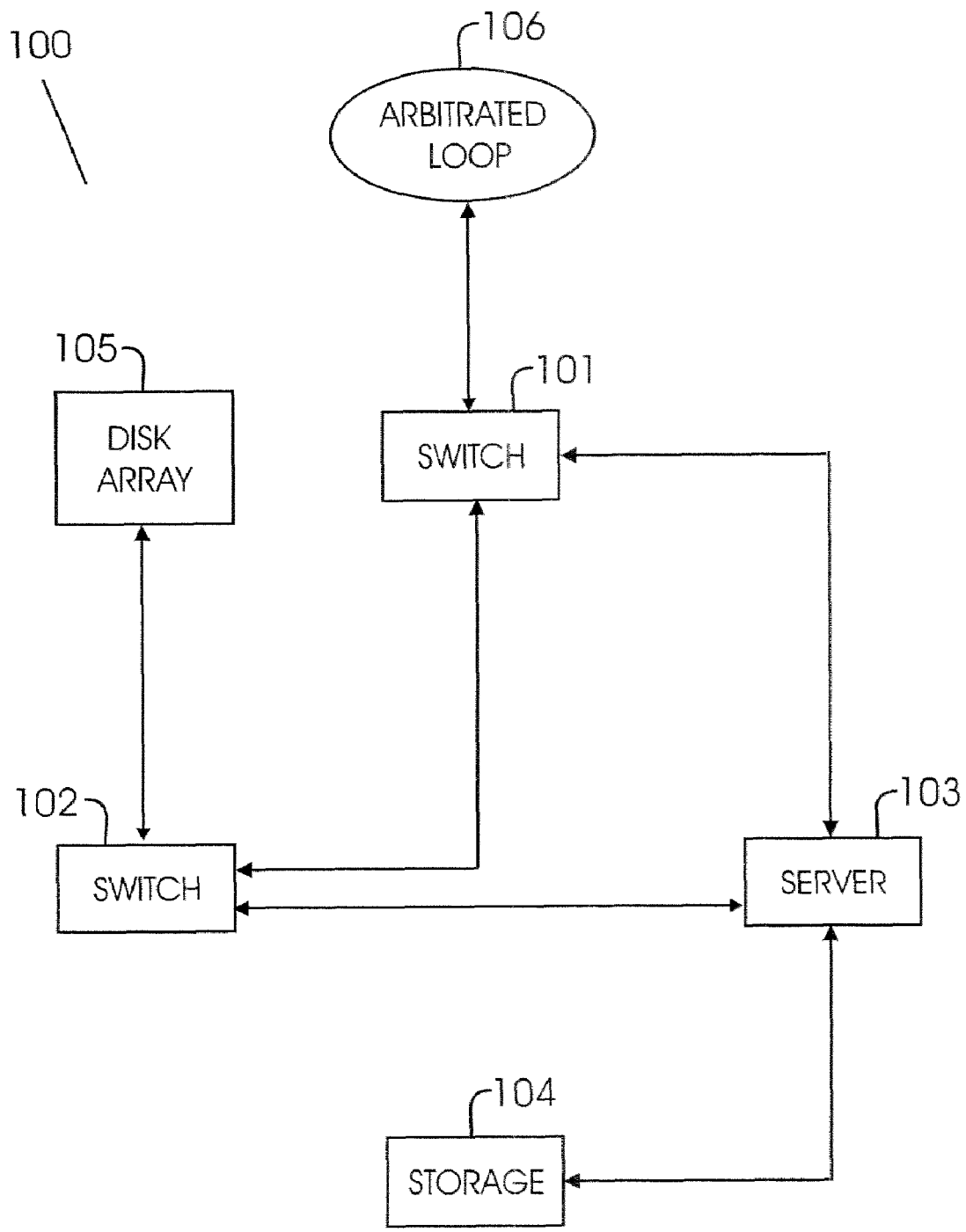
FIG. 1A shows an example of a Fibre Channel network system.

The following definitions are provided as they are typically (but not exclusively) used in the fibre channel environment, implementing the various adaptive aspects of the present invention.

"Delta Time Value": A value inserted in the fibre channel frame that denotes the total time a frame has spent while frame is in transit from a source port to a destination port.

"D_ID": 24 bit fibre channel header field that contains destination address.

"Domain_Id": The high 8 bits of a 24 bit fibre channel address that identifies a switch within a fabric.

"EOF": End of Frame, defined by Fibre Channel standards.

"E-Port": A fabric expansion port that attaches to another Interconnect port to create an Inter-Switch Link.

"F-Port": A port to which non-loop N_Ports are attached to a fabric and does not include FL_ports.

"Fibre channel ANSI Standard": The standard, incorporated herein by reference in its entirety, describes the physical interface, transmission and signaling protocol of a high performance serial link for support of other high level protocols associated with IPI, SCSI, IP, ATM and others.

"FC-1": Fibre channel transmission protocol, which includes serial encoding, decoding and error control.

"FC-2": Fibre channel signaling protocol that includes frame structure and byte sequences.

"FC-3": Defines a set of fibre channel services that are common across plural ports of a node.

"FC-4": Provides mapping between lower levels of fibre channel, IPI and SCSI command sets, HIPPI data framing, IP and other upper level protocols.

"FC-FS": Fibre channel standard, incorporated herein by reference in its entirety, for framing and signaling, including frame structure, basic link maintenance and login, and sequence and exchange operation, incorporated herein by reference in its entirety.

"FC-GS-3": Fibre channel specification incorporated herein by reference in its entirety for fabric servers and includes zoning.

"Fabric": The structure or organization of a group of switches, target and host devices (NL_Port, N_ports etc.).

"Fabric Topology": This is a topology where a device is directly attached to a fibre channel fabric that uses destination identifiers embedded in frame headers to route frames through a fibre channel fabric to a desired destination.

"FL_Port": A L_Port that is able to perform the function of a F_Port, attached via a link to one or more NL_Ports in an Arbitrated Loop topology.

"Global Time Value": means a time value with respect to a switch element (for example, an ASIC) and not the entire fabric.

"Hard Zoning": This restricts access to certain ports by filtering frames.

"Inter-Switch Link": A Link directly connecting the E_port of one switch to the E_port of another switch.

Port: A general reference to N. Sub.—Port or F.Sub.—Port.

"L_Port": A port that contains Arbitrated Loop functions associated with the Arbitrated Loop topology.

"N-Port": A direct fabric attached port.

"NL_Port": A L_Port that can perform the function of a N_Port.

"S_ID": 24 bit fibre channel header field that contains the source address of a frame.

"SOF": Start of Frame, defined by Fibre Channel standards.

"Switch": A fabric element conforming to the Fibre Channel Switch standards.

"Time Out": A duration that has exceeded or is equal to a certain threshold value. This indicates that a frame has been waiting for processing for more than a desired time period within a fibre channel switch element.

Fibre Channel System:

To facilitate an understanding of the preferred embodiment, the general architecture and operation of a fibre channel system will be described. The specific architecture and operation of the preferred embodiment will then be described with reference to the general architecture of the fibre channel system.

FIG. 1A is a block diagram of a fibre channel system 100 implementing the methods and systems in accordance with the adaptive aspects of the present invention. System 100 includes plural devices that are interconnected. Each device includes one or more ports, classified as node ports (N_Ports), fabric ports (F_Ports), and expansion ports (E_Ports). Node ports may be located in a node device, e.g. server 103, disk array 105 and storage device 104. Fabric ports are located in fabric devices such as switch 101 and 102. Arbitrated loop 106 may be operationally coupled to switch 101 using arbitrated loop ports (FL_Ports).

The devices of FIG. 1A are operationally coupled via "links" or "paths". A path may be established between two N_ports, e.g. between server 103 and storage 104. A packet-switched path may be established using multiple links, e.g. an N-Port in server 103 may establish a path with disk array 105 through switch 102.

Fabric Switch Element

Figure 1B:
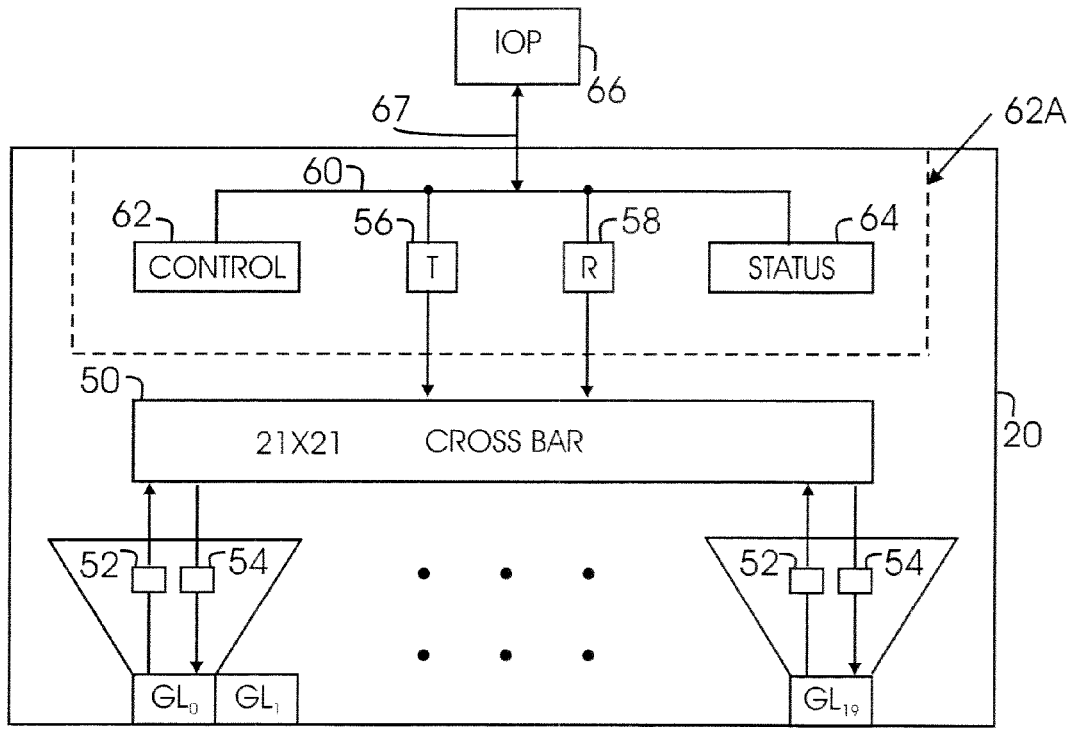
FIG. 1B shows an example of a Fibre Channel switch element, according to one aspect of the present invention.

FIG. 1B is a block diagram of a 20-port ASIC fabric element according to one aspect of the present invention. FIG. 1B provides the general architecture of a 20-channel switch chassis using the 20-port fabric element. Fabric element includes ASIC 20 with non-blocking fibre channel class 2 (connectionless, acknowledged) and class 3 (connectionless, unacknowledged) service between any ports. It is noteworthy that ASIC 20 may also be designed for class 1 (connection-oriented) service, within the scope and operation of the present invention as described herein.

The fabric element of the present invention is presently implemented as a single CMOS ASIC, and for this reason the term "fabric element" and ASIC are used interchangeably to refer to the preferred embodiments in this specification. Although FIG. 1B shows 20 ports, the present invention is not limited to any particular number of ports.

ASIC 20 has 20 ports numbered in FIG. 1B as GL0 through GL19. These ports are generic to common Fibre Channel port types, for example, F_Port, FL_Port and E-Port. In other words, depending upon what it is attached to, each GL port can function as any type of port. Also, the GL port may function as a special port useful in fabric element linking, as described below.

For illustration purposes only, all GL ports are drawn on the same side of ASIC 20 in FIG. 1B. However, the ports may be located on both sides of ASIC 20 as shown in other figures. This does not imply any difference in port or ASIC design. Actual physical layout of the ports will depend on the physical layout of the ASIC.

Each port GL0-GL19 has transmit and receive connections to switch crossbar 50. One connection is through receive buffer 52, which functions to receive and temporarily hold a frame during a routing operation. The other connection is through a transmit buffer 54.

Switch crossbar 50 includes a number of switch crossbars for handling specific types of data and data flow control information. For illustration purposes only, switch crossbar 50 is shown as a single crossbar. Switch crossbar 50 is a connectionless crossbar (packet switch) of known conventional design, sized to connect 21×21 paths. This is to accommodate 20 GL ports plus a port for connection to a fabric controller, which may be external to ASIC 20.

In the preferred embodiments of switch chassis described herein, the fabric controller is a firmware-programmed microprocessor, also referred to as the input/out processor ("IOP"). IOP 66 is shown in FIG. 10 as a part of a switch chassis utilizing one or more of ASIC 20. As seen in FIG. 1B, bi-directional connection to IOP 66 is routed through port 67, which connects internally to a control bus 60. Transmit buffer 56, receive buffer 58, control register 62 and Status register 64 connect to bus 60. Transmit buffer 56 and receive buffer 58 connect the internal connectionless switch crossbar 50 to IOP 66 so that it can source or sink frames.

Control register 62 receives and holds control information from IOP 66, so that IOP 66 can change characteristics or operating configuration of ASIC 20 by placing certain control words in register 62. IOP 66 can read status of ASIC 20 by monitoring various codes that are placed in status register 64 by monitoring circuits (not shown).

Figure 1C:
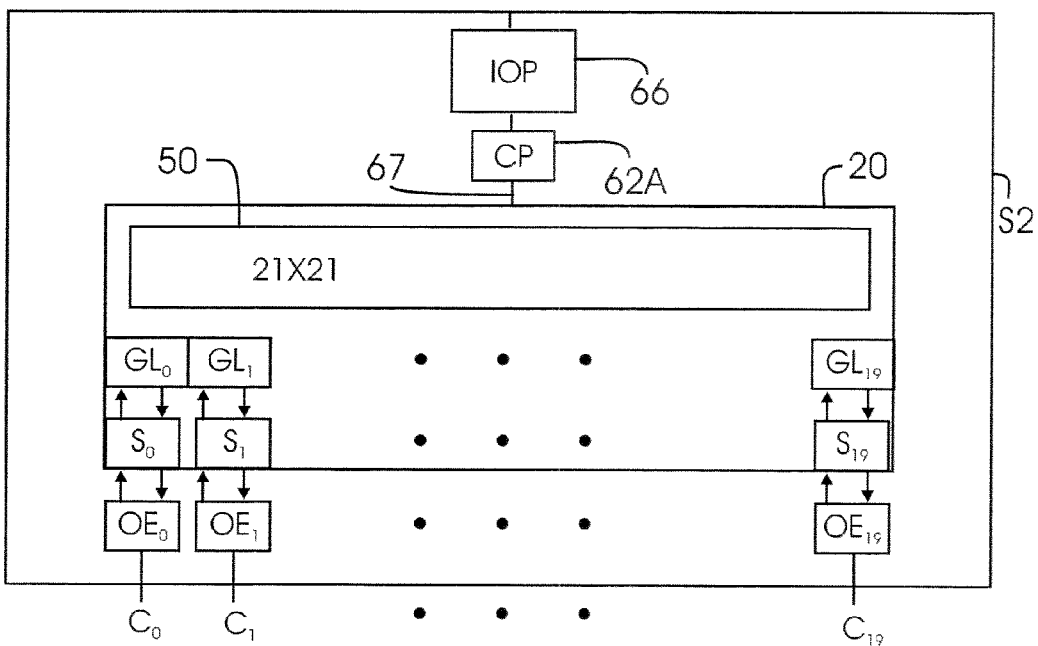
FIG. 1C shows a block diagram of a 20-channel switch chassis, according to one aspect of the present invention.

FIG. 1C shows a 20-channel switch chassis S2 using ASIC 20 and IOP 66. S2 will also include other elements, for example, a power supply (not shown). The 20 GL ports correspond to channel C0-C19. Each CL port has a serial/deserializer (SERDES) designated as S0-S19. Ideally, the SERDES functions are implemented on ASIC 20 for efficiency, but may alternatively be external to each GL port.

Each GL port has an optical-electric converter, designated as OE0-OE19 connected with its SERDES through serial lines, for providing fibre optic input/output connections, as is well known in the high performance switch design. The converters connect to switch channels C0-C19. It is noteworthy that the ports can connect through copper paths or other means instead of optical-electric converters.

Figure 1D:
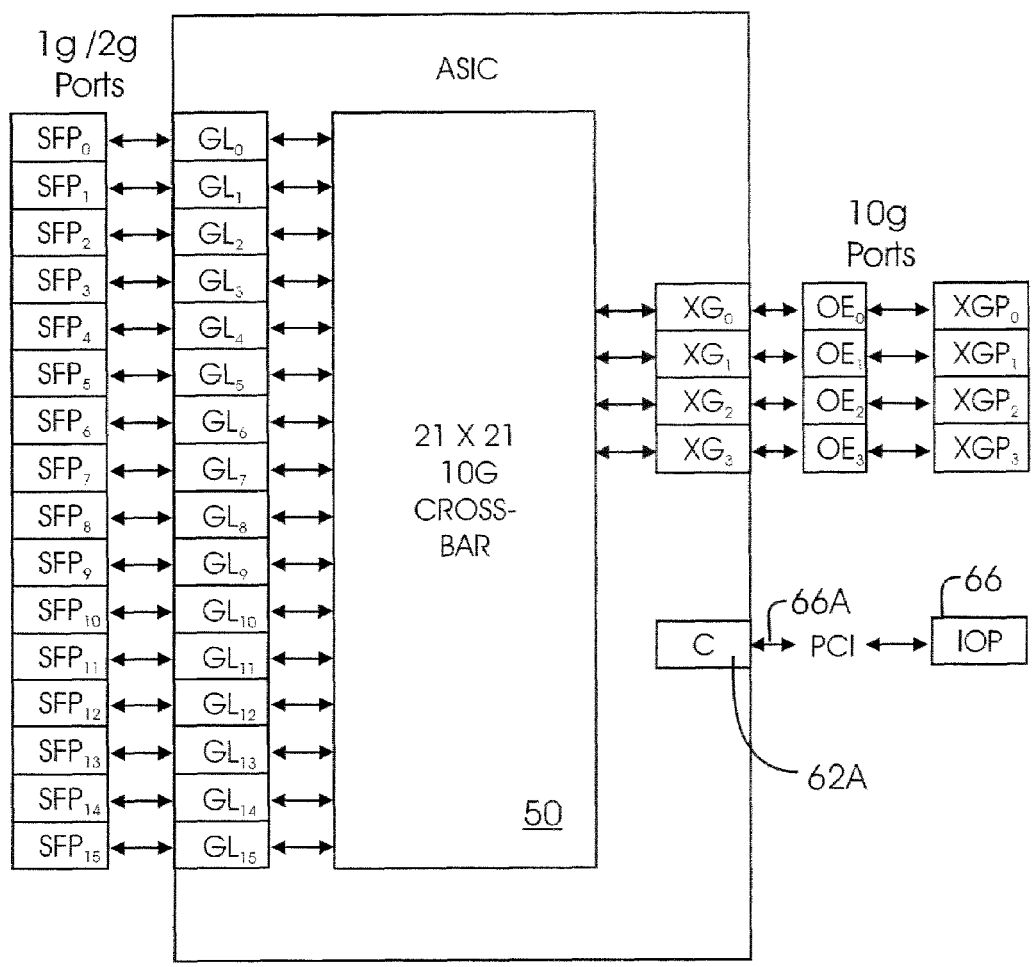
FIG. 1D shows a block diagram of a Fibre Channel switch element with sixteen GL_Ports and four 10G ports, according to one aspect of the present invention.
Figure 2A:
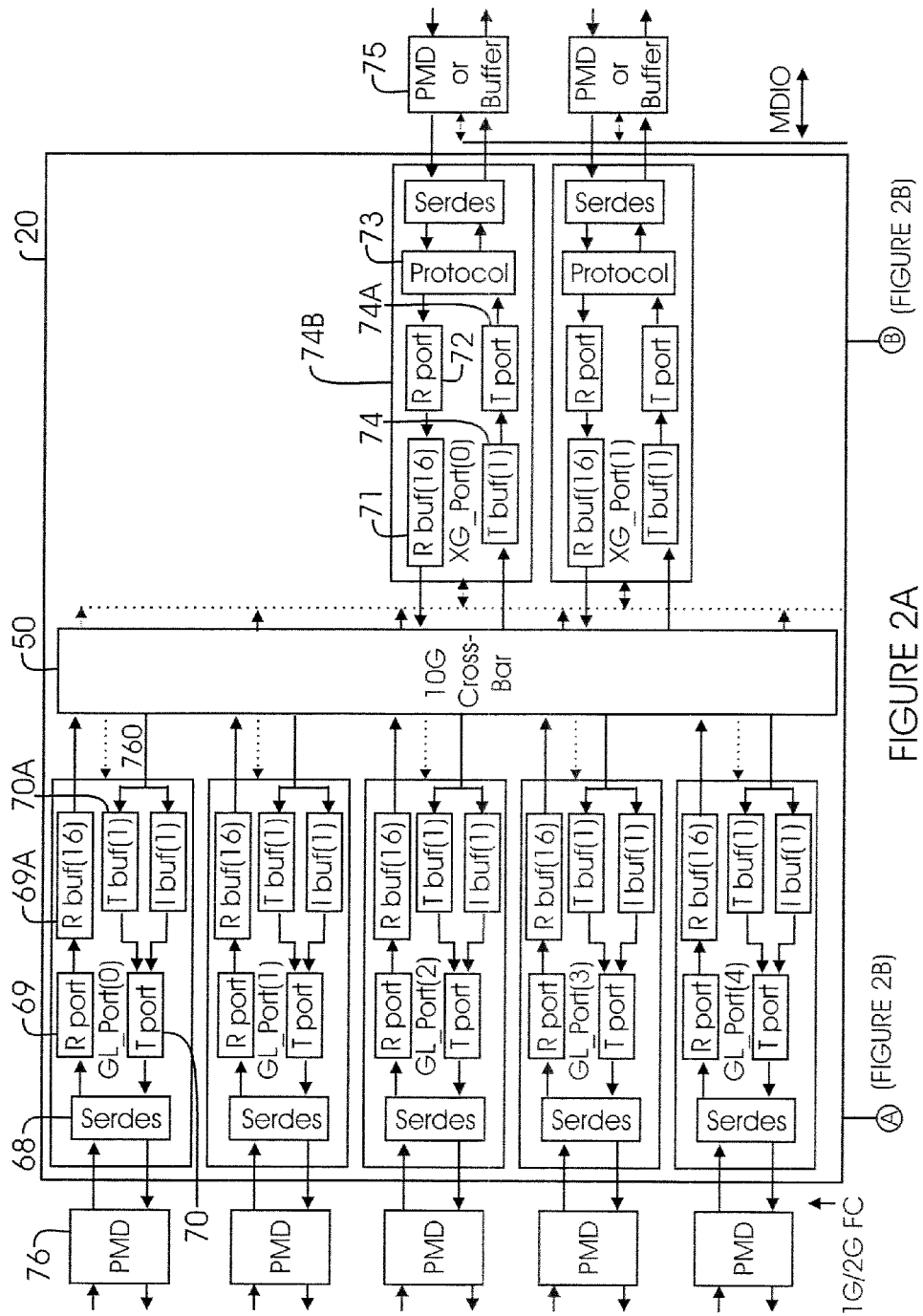
FIGS. 2A/2B (jointly referred to as FIG. 2) show another block diagram of a Fibre Channel switch element with sixteen GL_Ports and four 10G ports, according to one aspect of the present invention.
Figure 2B:
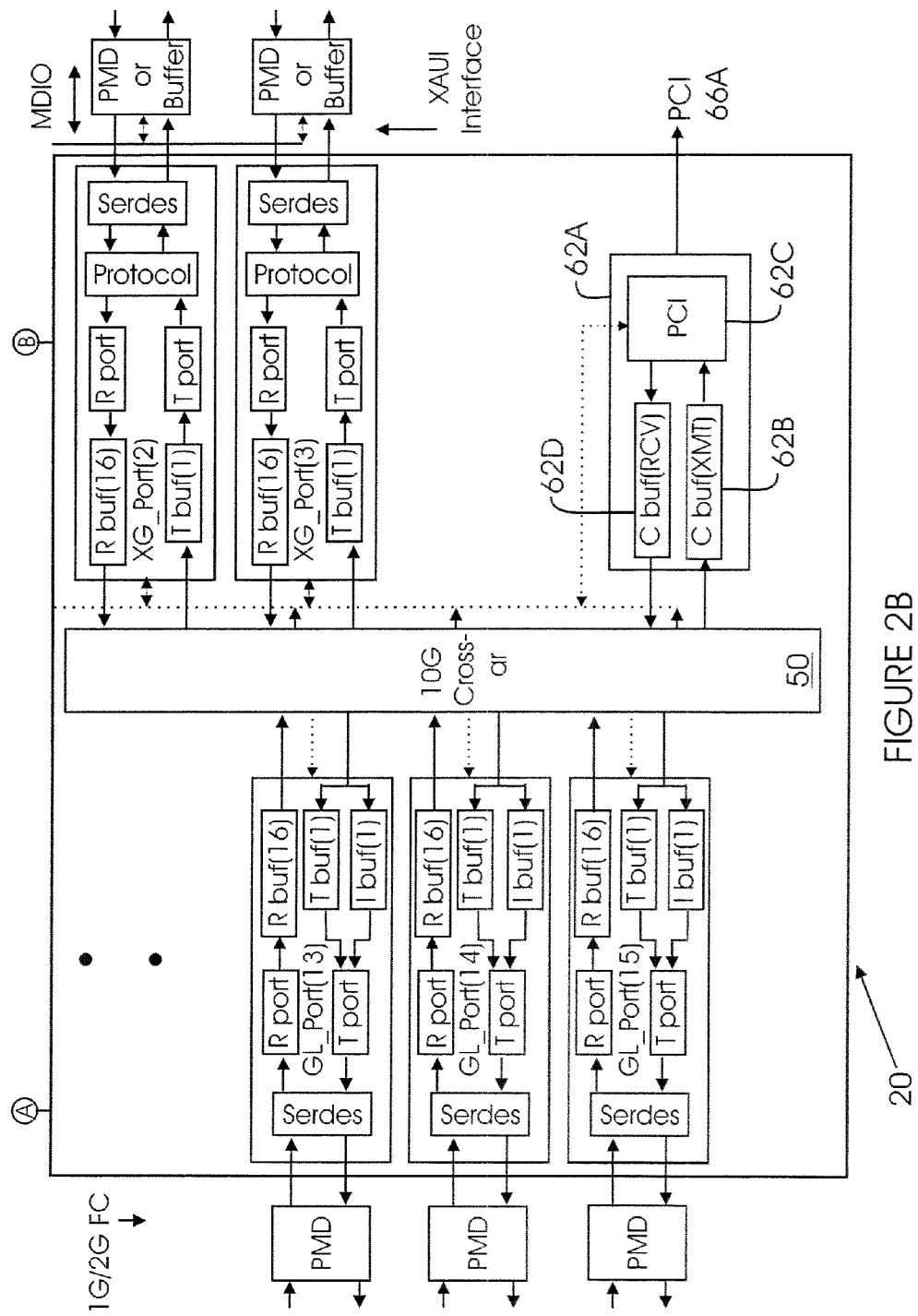

FIG. 1D shows a block diagram of ASIC 20 with sixteen GL ports and four 10G (Gigabyte) port control modules designated as XG0-XG3 for four 10G ports designated as XGP0-XGP3. ASIC 20 include a control port 62A that is coupled to IOP 66 through a PCI connection 66A.

Figures 1, 5A:
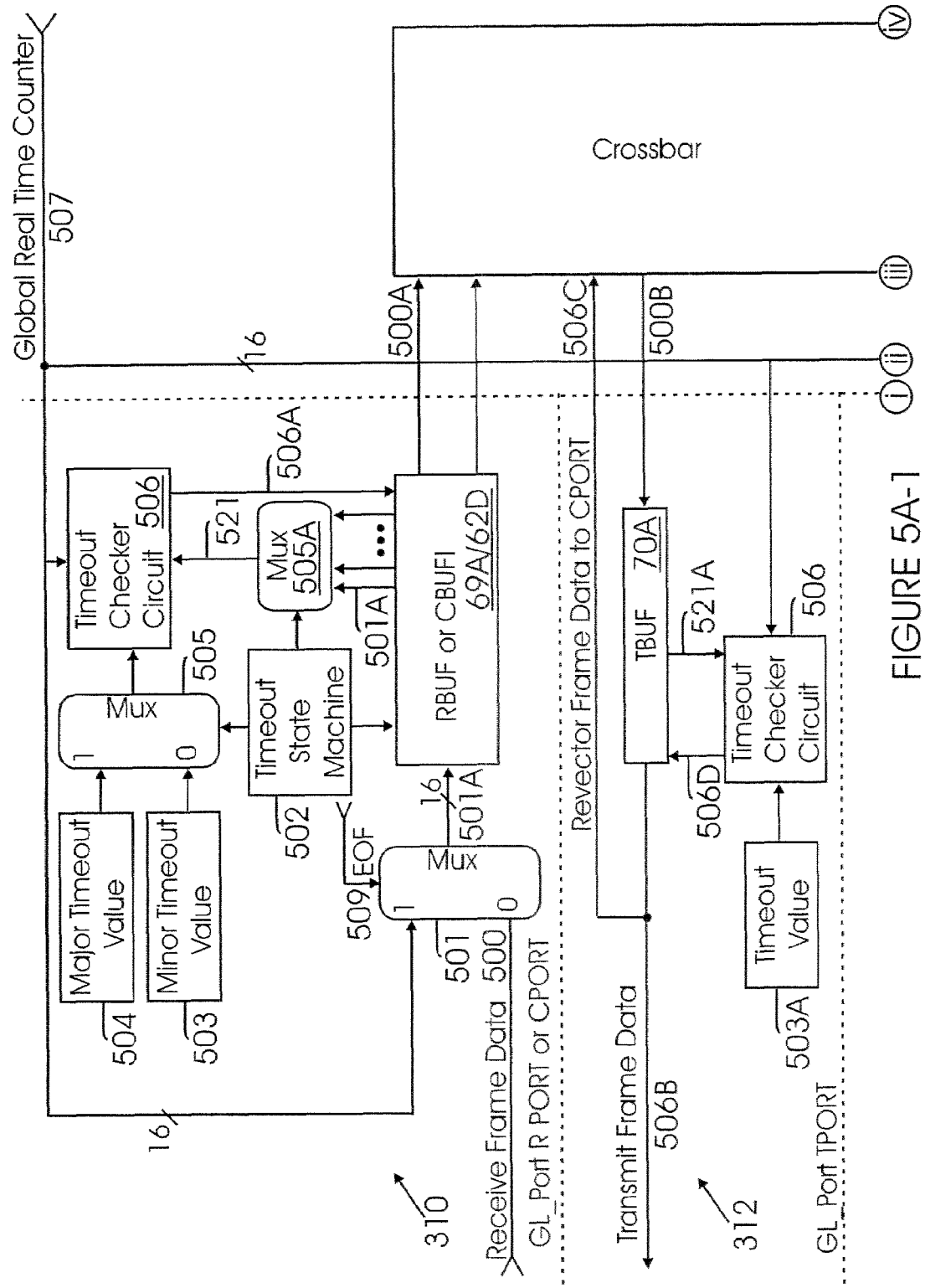
FIGS. 5A-1/5A-2 (referred to herein as FIG. 5A) show a schematic with a timestamp feature, according to one aspect of the present invention.
Figures 2, 5A:
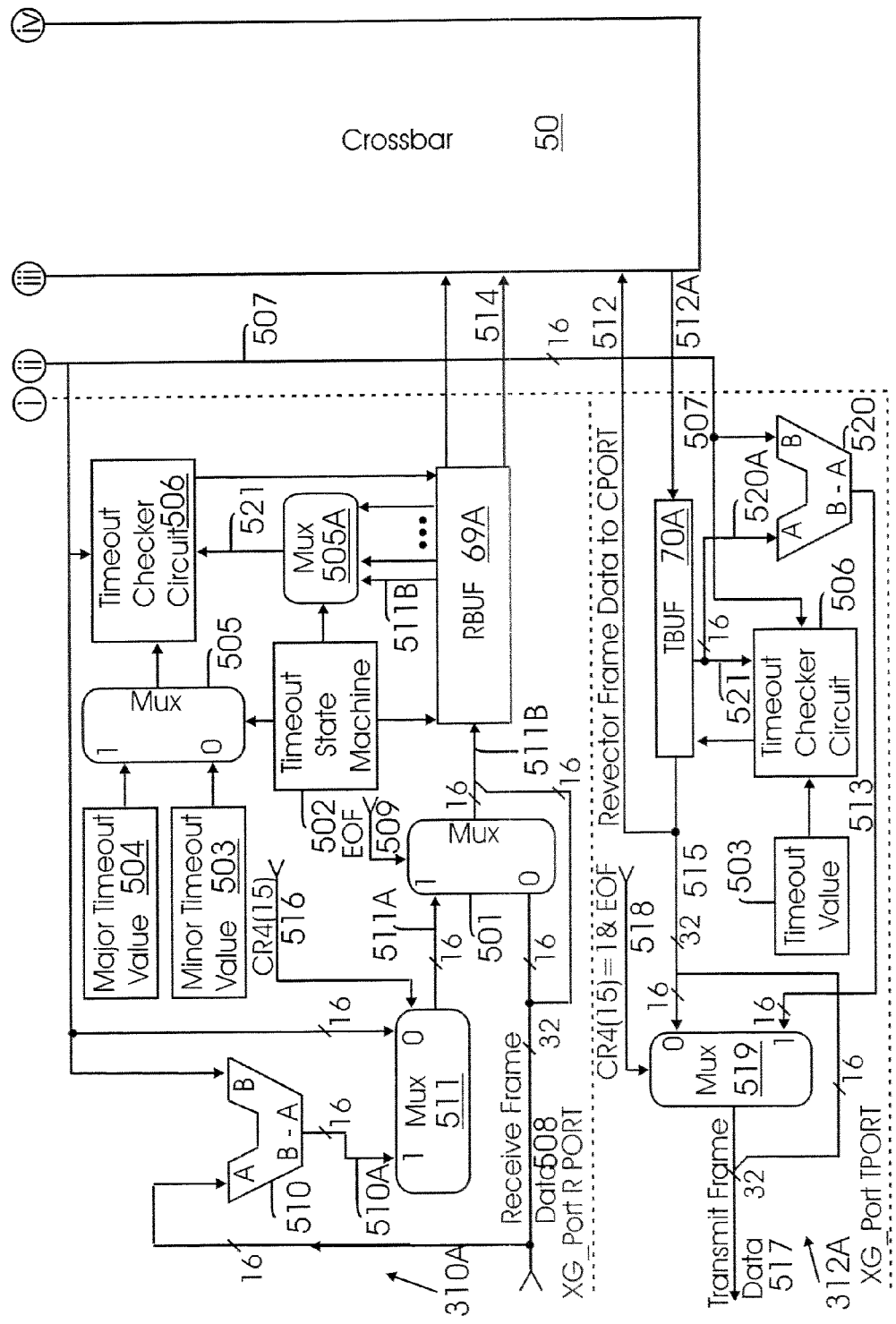

FIG. 2 shows yet another block diagram of ASIC 20 with sixteen GL and four XG port control modules. Each GL port control module has a Receive port (RPORT) 69 with a receive buffer (RBUF) 69A and a transmit port 70 with a transmit buffer (TBUF) 70A, as described below in detail. GL and XG port control modules are coupled to physical media devices ("PMD") 76 and 75 respectively.

Control port module 62A includes control buffers 62B and 62D for transmit and receive sides, respectively. Module 62A also includes a PCI interface module 62C that allows interface with IOP 66 via a PCI bus 66A.

XG_Port (for example 74B) includes RPORT 72 with RBUF 71 similar to RPORT 69 and RBUF 69A and a TBUF and TPORT similar to TBUF 70A and TPORT 70. Protocol module 73 interfaces with SERDES to handle protocol based functionality.

Figure 3A:
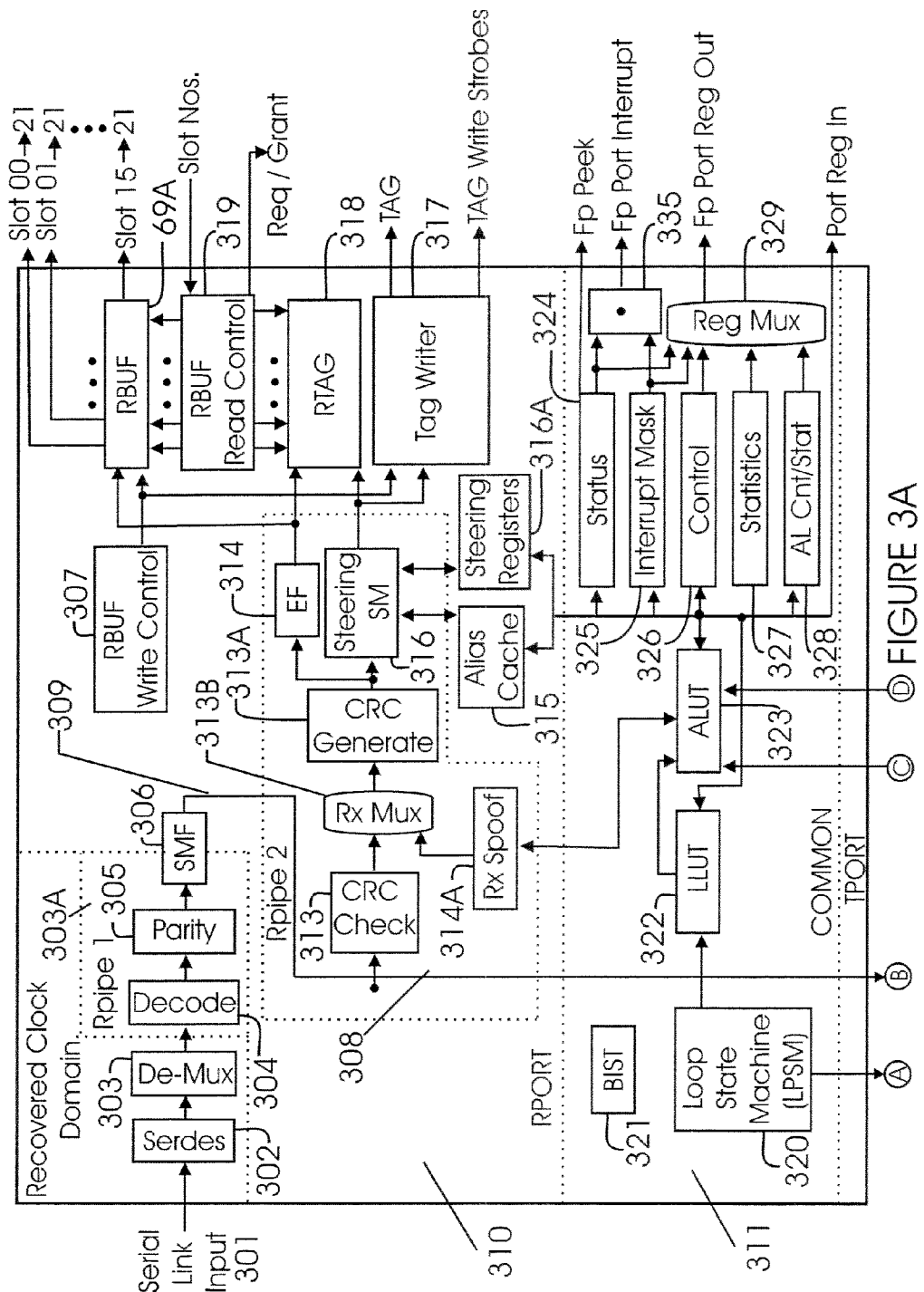
FIGS. 3A/3B (jointly referred to as FIG. 3) show a block diagram of a GL_Port, according to one aspect of the present invention.
Figure 3B:
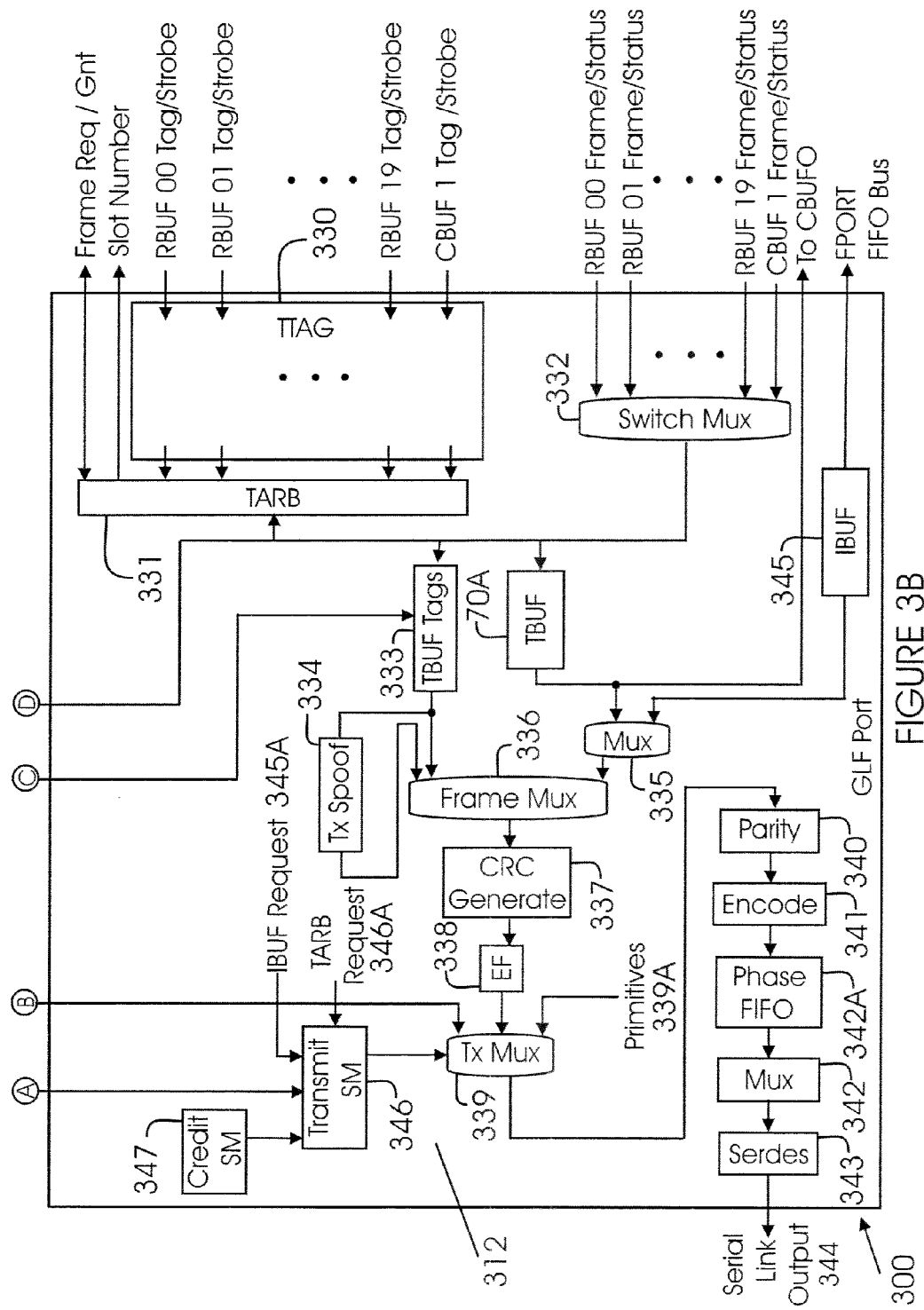

GL_Port:

FIGS. 3A-3B (referred to as FIG. 3) show a detailed block diagram of a GL port as used in ASIC 20. GL port 300 is shown in three segments, namely, receive segment (RPORT) 310, transmit segment (TPORT) 312 and common segment 311.

Receive Segment of GL_Port:

Frames enter through link 301 and SERDES 302 converts data into 10-bit parallel data to fibre channel characters, which are then sent to receive pipe ("Rpipe" may be referred to as Rpipe 1 and/or Rpipe 2) 303A via a de-multiplexer (DEMUX) 303. Rpipe 303A includes, parity module 305 and decoder 304. Decoder 304 decodes 10B data to 8B and parity module 305 adds a parity bit. Rpipe 303A also performs various Fibre Channel standard functions such as detecting a start of frame (SOF), end-of frame (EOF), Idles, R_RDYs (fibre channel standard primitive) and the like, which are not described since they are standard functions.

Rpipe 303A connects to smoothing FIFO (SMF) module 306 that performs smoothing functions to accommodate clock frequency variations between remote transmitting and local receiving devices.

Frames received by RPORT 310 are stored in receive buffer (RBUF) 69A, (except for certain Fibre Channel Arbitrated Loop (AL) frames). Path 309 shows the frame entry path, and all frames entering path 309 are written to RBUF 69A as opposed to the AL path 308.

Cyclic redundancy code (CRC) module 313 further processes frames that enter GL port 300 by checking CRC and processing errors according to FC_PH rules. The frames are subsequently passed to RBUF 69A where they are steered to an appropriate output link. RBUF 69A is a link receive buffer and can hold multiple frames.

Reading from and writing to RBUF 69A are controlled by RBUF read control logic ("RRD", 319 and RBUF write control logic ("RWT") 307, respectively. RWT 307 specifies which empty RBUF 69A slot will be written into when a frame arrives through the data link via multiplexer 313B, CRC generate module 313A and EF module 314. EF (external proprietary format) module 314 encodes proprietary (i.e. non-standard) format frames to standard Fibre Channel 8B codes. Mux 313B receives input from Rx Spoof module 314A, which encodes frames to a proprietary format (if enabled). RWT 307 controls RBUF 69A write addresses and provides the slot number to tag writer ("TWT") 317.

RRD 319 processes frame transfer requests from RBUF 69A. Frames may be read out in any order and multiple destinations may get copies of the frames.

Steering state machine (SSM, 316 receives frames and determines the destination for forwarding the frame. SSM 316 produces a destination mask, where there is one bit for each destination. Any bit set to a certain value, for example, 1, specifies a legal destination, and there can be multiple bits set, if there are multiple destinations for the same frame (multi-cast or broadcast).

SSM 316 makes this determination using information from alias cache 315, steering registers 316A, control register 326 values and frame contents. IOP 66 writes all tables so that correct exit path is selected for the intended destination port addresses.

The destination mask from SSM 316 is sent to TWT 317 and a RBUF tag register (RTAG) 318. TWT 317 writes tags to all destinations specified in the destination mask from SSM 316. Each tag identifies its corresponding frame by containing an RBUF 69A slot number where the frame resides, and an indication that the tag is valid.

Each slot in RBUF 69A has an associated set of tags, which are used to control the availability of the slot. The primary tags are a copy of the destination mask generated by SSM 316. As each destination receives a copy of the frame, the destination mask in RTAG 318 is cleared. When all the mask bits are cleared, it indicates that all destinations have received a copy of the frame and that the corresponding frame slot in RBUF 69A is empty and available for a new frame.

RTAG 318 also has frame content information that is passed to a requesting destination to pre-condition the destination for the frame transfer. These tags are transferred to the destination via a read multiplexer (RMUX) (not shown).

Transmit Segment of GL_Port:

Transmit segment (TPORT) 312 performs various transmit functions. Transmit tag register (TTAG) 330 provides a list of all frames that are to be transmitted. Tag Writer 317 or common segment 311 write TTAG 330 information. The frames are provided to arbitration module ("transmit arbiter" ("TARB")) 331, which is then free to choose which source to process and which frame from that source to be processed next.

TTAG 330 includes a collection of buffers (for example, buffers based on a first-in first out ("FIFO") scheme) for each frame source. TTAG 330 writes a tag for a source and TARB 331 then reads the tag. For any given source, there are as many entries in TTAG 330 as there are credits in RBUF 69A.

TARB 331 is activated anytime there are one or more valid frame tags in TTAG 330. TARB 331 preconditions its controls for a frame and then waits for the frame to be written into TBUF 70A. After the transfer is complete, TARB 331 may request another frame from the same source or choose to service another source.

TBUF 70A is the path to the link transmitter. Typically, frames don't land in TBUF 70A in their entirety. Mostly, frames simply pass through TBUF 70A to reach output pins, if there is a clear path.

Switch Mux 332 is also provided to receive output from crossbar 50. Switch Mux 332 receives input from plural RBUFs (shown as RBUF 00 to RBUF 19), and input from CPORT 62A shown as CBUF 1 frame/status. TARB 331 determines the frame source that is selected and the selected source provides the appropriate slot number. The output from Switch Mux 332 is sent to ALUT 323 for S_ID spoofing and the result is fed into TBUF Tags 333.

TxMUX 339 chooses which data path to connect to the transmitter. The sources are: primitive sequences specified by IOP 66 via control registers 326 (shown as primitive 339A), and signals as specified by Transmit state machine ("TSM") 346, frames following the loop path, or steered frames exiting the fabric via TBUF 70A.

TSM 346 chooses the data to be sent to the link transmitter, and enforces all fibre Channel rules for transmission. TSM 346 receives requests to transmit from loop state machine 320, TBUF 70A (shown as TARB request 346A) and from various other IOP 66 functions via control registers 326 (shown as IBUF Request 345A). TSM 346 also handles all credit management functions, so that Fibre Channel connectionless frames are transmitted only when there is link credit to do so.

Loop state machine ("LPSM") 320 controls transmit and receive functions when GL_Port is in a loop mode. LPSM 320 operates to support loop functions as specified by FC-AL-2.

IOP buffer ("IBUF") 345 provides IOP 66 the means for transmitting frames for special purposes.

Frame multiplexer ("Frame Mux") 336 chooses the frame source, while logic (TX spoof 334) converts D_ID and S_ID from public to private addresses. Frame Mux 336 receives input from Tx Spoof module 334, TBUF tags 333, and Mux 335 to select a frame source for transmission.

EF (external proprietary format) module 338 encodes proprietary (i.e. non-standard) format frames to standard Fibre Channel 8B codes and CRC module 337 generates CRC data for the outgoing frames.

Modules 340-343 put a selected transmission source into proper format for transmission on an output link 344. Parity 340 checks for parity errors, when frames are encoded from 8B to 10B by encoder 341, marking frames "invalid", according to Fibre Channel rules, if there was a parity error. Phase FIFO 342A receives frames from encode module 341 and the frame is selected by Mux 342 and passed to SERDES 343. SERDES 343 converts parallel transmission data to serial before passing the data to the link media. SERDES 343 may be internal or external to ASIC 20.

Common Segment of GL_Port:

As discussed above, ASIC 20 include common segment 311 comprising of various modules. LPSM 320 has been described above and controls the general behavior of TPORT 312 and RPORT 310.

A loop look up table ("LLUT") 322 and an address look up table ("ALUT") 323 is used for private loop proxy addressing and hard zoning managed by firmware.

Common segment 311 also includes control register 326 that controls bits associated with a GL_Port, status register 324 that contains status bits that can be used to trigger interrupts, and interrupt mask register 325 that contains masks to determine the status bits that will generate an interrupt to IOP 66. Common segment 311 also includes AL control and status register 328 and statistics register 327 that provide accounting information for FC management information base ("MIB").

Output from status register 324 may be used to generate a Fp Peek function. This allows a status register 324 bit to be viewed and sent to the CPORT.

Output from control register 326, statistics register 327 and register 328 (as well as 328A for an X_Port, shown in FIG. 4) is sent to Mux 329 that generates an output signal (FP Port Reg Out).

Output from Interrupt register 325 and status register 324 is sent to logic 335 to generate a port interrupt signal (FP Port Interrupt).

BIST module 321 is used for conducting embedded memory testing.

XG_Port

Figure 4A:
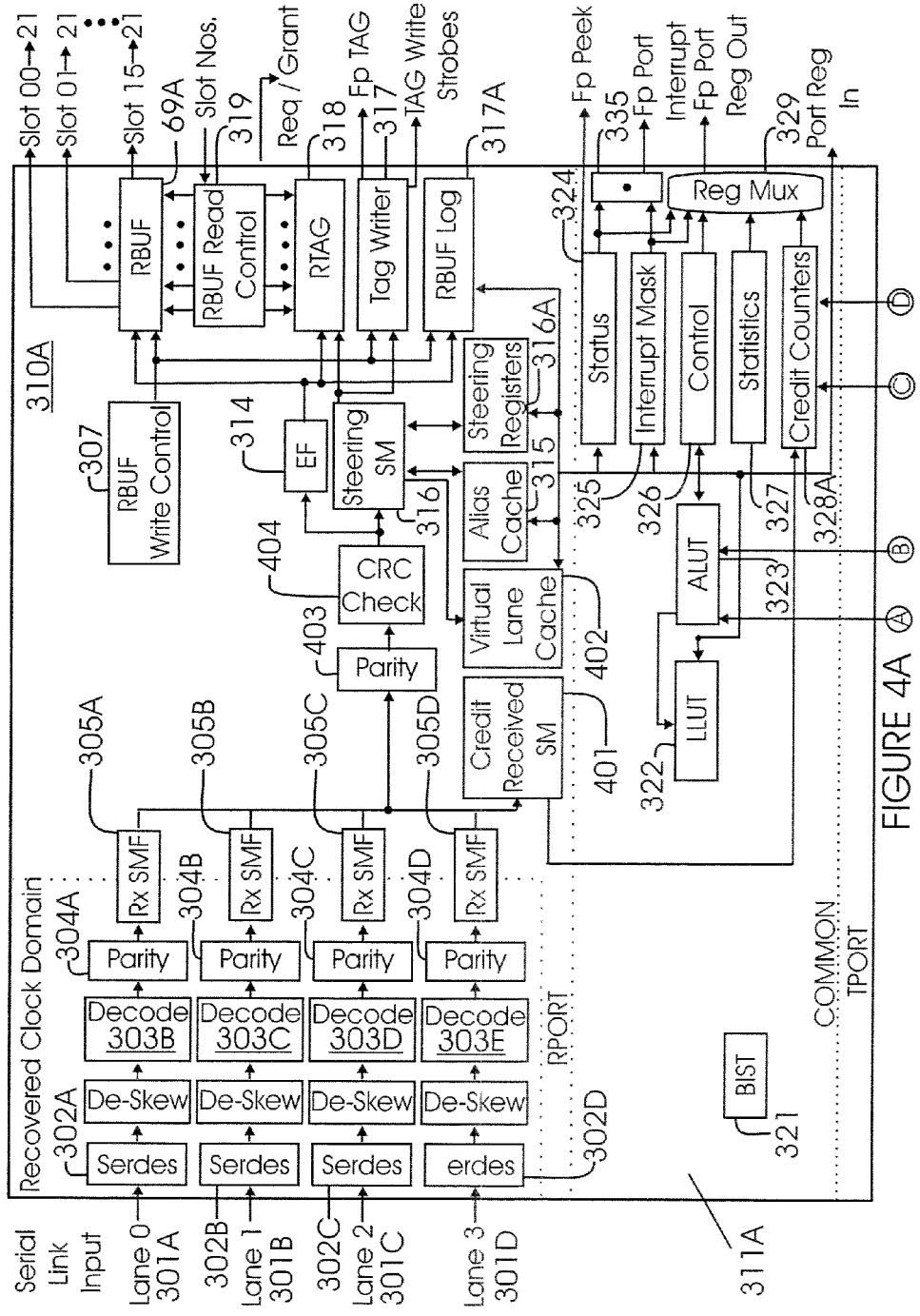
FIGS. 4A/4B (jointly referred to as FIG. 3) show a block diagram of XG_Port (10G) port, according to one aspect of the present invention.
Figure 4B:
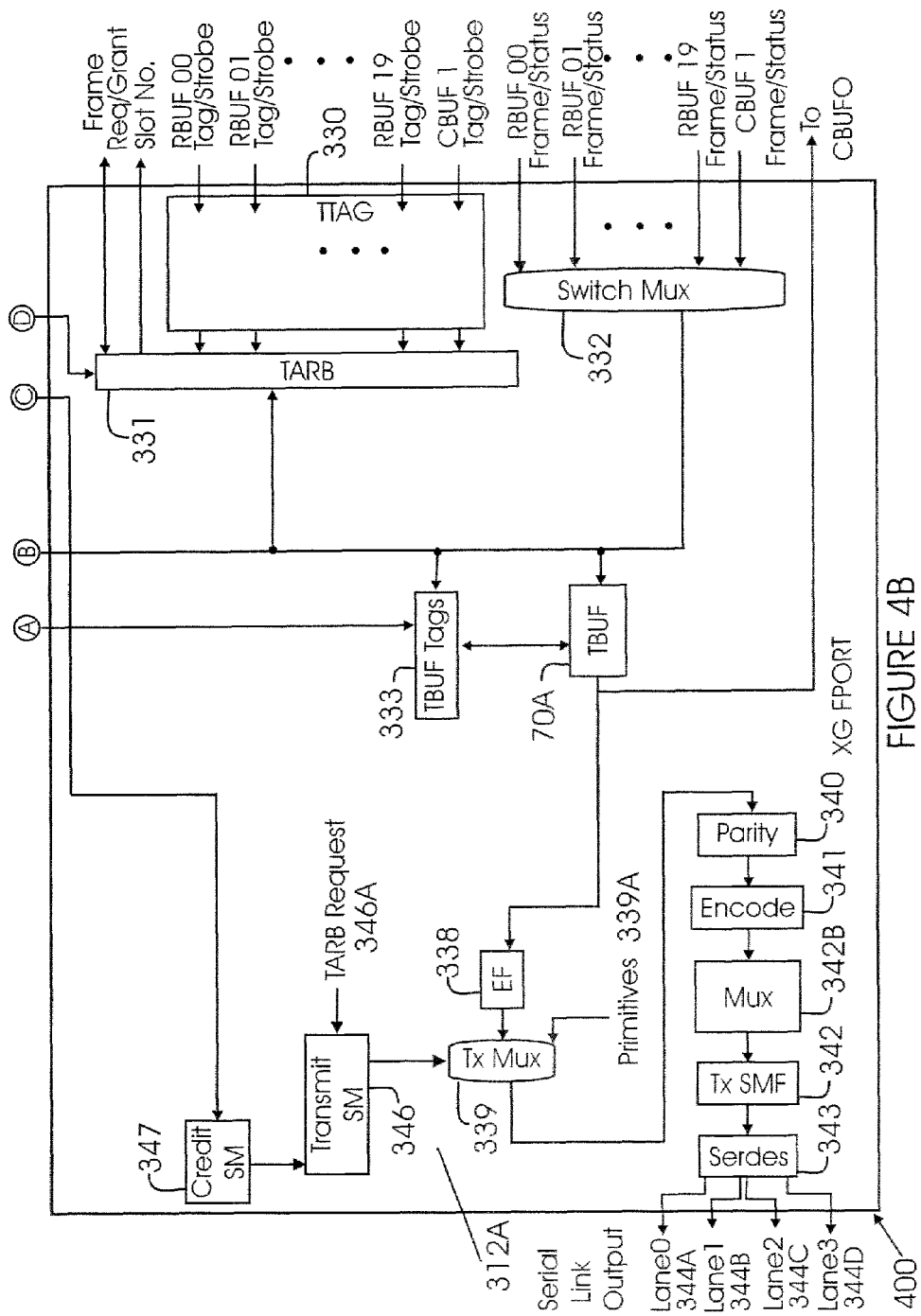

FIGS. 4A-4B (referred to as FIG. 4) show a block diagram of a 10G Fibre Channel port control module (XG FPORT) 400 used in ASIC 20. Various components of XG FPORT 400 are similar to GL port control module 300 that are described above. For example, RPORT 310 and 310A, Common Port 311 and 311A, and TPORT 312 and 312A have common modules as shown in FIGS. 3 and 4 with similar functionality.

RPORT 310A can receive frames from links (or lanes) 301A-301D and transmit frames to lanes 344A-344D. Each link has a SERDES (302A-302D), a de-skew module, a decode module (303B-303E) and parity module (304A-304D). Each lane also has a smoothing FIFO (SMF) module 305A-305D that performs smoothing functions to accommodate clock frequency variations. Parity errors are checked by module 403, while CRC errors are checked by module 404.

RPORT 310A uses a virtual lane ("VL") cache 402 that stores plural vector values that are used for virtual lane assignment. In one aspect of the present invention, VL Cache 402 may have 32 entries and two vectors per entry. IOP 66 is able to read or write VL cache 402 entries during frame traffic. State machine 401 controls credit that is received. On the transmit side, credit state machine 347 controls frame transmission based on credit availability. State machine 347 interfaces with credit counters 328A.

Also on the transmit side, modules 340-343 are used for each lane 344A-344D, i.e., each lane can have its own module 340-343. Parity module 340 checks for parity errors and encode module 341 encodes 8-bit data to 10 bit data. Mux 342B sends the 10-bit data to a Tx SMF (transmit side smoothing FIFO) module 342 that handles clock variation on the transmit side. SERDES 343 then sends the data out to the link.

Time Stamp Features:

In one aspect of the present invention, frame data when received by RPORT 310 is provided a time stamp based on a Global Real Time counter value. The time stamp value is compared to a time out value to determine if a frame has timed out. If all copies of the received frames are moved out of switch element 20 before a time out occurs, nothing happens. IOP 66 can use time stamp information to prioritize frame processing.

If a frame times out before copies are sent to all destinations, the frame is tagged by RBUF 69A as having timed out. When a destination requests a copy of the frame, it is notified of the time out. The destination then reads the frame and disposes the frame according to a programmable policy, for example, Class 3 frames are tossed and Class 2 frames are sent to IOP 66 so that an F_BSY signal can be sent to the sender.

Various types of time out values may be used to determine if a frame has timed out. For example, a major or minor time out value may be used. If a minor time out has occurred for a frame then the frame is still kept in RBUF 69A or TBUF 70A. Minor time out can be programmed to any value. In one aspect, the minor time out value may be in the range of 0 milliseconds to 66.975 seconds in 1.02 millisecond increments.

In one aspect of the present invention, minor time out is determined in RPORT 310/TPORT 312 by comparing the frame's time stamp located in bits 16 to 31 of the EOF to the sum of a current Global Real Time counter value (507) (i.e. global with respect to ASIC 20) and a minor time out value (503).

If a major time out occurs then it denotes that a frame has resided in RBUF 69A longer than a "major time out value". In this case the frame is rejected and the RBUF 69A slot is cleared. Major time out value (504) can be programmed. In one aspect, the major time out value may be in the range of 0 to 66.975 seconds in 1.02 milliseconds.

In one aspect of the present invention, if a major time out occurs but a read window is open (i.e., the frame is being read) and/or there are active read requests, then the read requests may be competed. If after the read window ends and there are no active read requests and destination bits are set, then the frame is tossed and a log error is generated.

It is noteworthy that although two time out categories have been described above (major and minor), the present invention is not limited to any particular number or value of time outs. For example, various (more than 2) incremental time out values may be used to trigger any action/inaction with respect to a frame. Also, any time out value may be programmed for such action/inaction.

GL_Port Receive Side Time Out Processing:

FIG. 5A shows a schematic with GL_Port and XG_Port using the time stamp features, according to the adaptive aspects of the present invention. For RPORT 310, frame data 500 is received. A time stamp (OLA) based on global real time counter value 507 (also referred to herein as value 507) is inserted in EOF 509. The output of Mux 501 (i.e. 501A) is then sent to RBUF 69A (or CBUF 62D).

When a frame lands into RBUF 69A, the time stamp 501A is extracted from the last word of the frame and loaded into a holding register (not shown). In one example, if RBUF 69A can hold 16 frames, there are 16 holding registers. In one aspect of the present invention, the time stamp could also be read from the RB F 69A, eliminating the need for the holding registers.

The time stamp value 501A is sent to a time out checker circuit 506 (described below) through Mux 505A (output of Mux 505A is shown as 521). Time out checker circuit 506 also receives a time out value (major time out value 504 and minor time out value 503) via Mux 505 and value 507. Time out circuit 506 (described below in detail with respect to FIG. 5B) compares the time stamp 501A with the time out values (504 and 503) and counter value 507. If a time out occurs a status 506A is set in RBUF 69A. Frame information 500A is sent to TPORT 312 via cross-bar 50 and includes a time stamp and time out status flag.

Time out state machine 502 monitors the time stamps of all the frames in RBUF 69A. State machine 502 sets a status flag if a time out occurs, which notifies a destination that requests a "timed out" frame.

Although the term "state machine" has been used for various components, it is not intended to limit the adaptive aspects of the present invention. Other hardware (for example, micro-controllers, or processors)/firmware components may be used to achieve similar functionality as the state machines referenced in the various parts of this specification.

GL_Port Transmit Side Time Out Processing:

When a frame (500B) lands in TBUF 70A, the time stamp value 521A is extracted and held. A time out value 503A is sent to the time out checker circuit 506. Time stamp 521A is compared to the sum global real-time counter value 507 and time out value 503A. If a time out occurs then the status 506D is sent to TEBU 70A. A frame that has timed out may be rejected based on a programmed rejection policy. If no time out occurs then the frame is sent via path 506B. Frame data may also be sent (re-vectored) to a CPORT, shown as 506C.

XG_Port Time Out Processing:

As shown in FIG. 5A, frame data 508 is received by RPORT 310A. Frame data may have a "delta time" feature/parameter/value (used interchangeably), which specifies the accumulated elapsed time for a frame. This feature is enabled by signal/command (the term is used interchangeably) 516 that is received from control register 326.

The delta time feature is configured on both ends of a communicating link. The feature would be negotiated at switch login time. This feature is very useful for E_Ports between switches, but can be used on any port type.

If signal 516 is enabled, then frame data 508 is expected to include the delta time value. The delta time value may be inserted in the EOF word on a 10 Gigabyte fibre channel link. Byte 3 uniquely identifies the word as an EOF. The other 3 bytes define the EOF type. By compressing the EOF type into a one byte EOF code, two bytes are available for the delta time value. Hence, in one aspect of the present invention, the delta time value may be received between 0 and 1 bytes of EOF word.

A similar feature may be used on a 1/2/4/8 Gigabyte FC link with some modification to the frame. This could be inserted in any fabric extension header or a delta time value may be inserted in the frame or a special word before or after the frame.

RPORT 310A includes logic 510 that receives frame data 508 with the delta time value and global real-time counter value 507. The output 510A of logic 510 provides the relative time stamp for port 310A by subtracting the delta time value in 508 from counter value 507. The new value 510A replaces the delta time value in frame 508 when the frame moves from RPORT 310A to TPORT 312A. in one aspect of the present invention, logic 510 may be a 16-bit subtractor.

Mux 501 receives input 508 if no delta time feature is enabled) and 511A (if delta time feature is enabled) and moves the frame data with time stamp 511B (similar to GL_Port described above) to PBUF 69A. This adjusted time stamp value accounts for the delta time elapsed, if the delta time feature is enabled. The time out checker circuit 506 as described above with respect to GL_Port processes the time stamp value 511B.

TPORT 312A has two modes of operation when delivering frames. In the normal mode, the EOF compressed code is replaced by the standard Fibre Channel version of EOF (32 bit value). Frame 512A enters TBUF 70A and if signal 518 is not active (i.e. there is no delta time feature), the frame is processed similar to TPORT 312 (i.e. 515 is similar to 506B and 512 is similar to 506C). In the second mode if signal 518 is active, then the upper 16 bits of the standard EOF are replaced by a delta time value. When the frame 512A arrives at TPORT 312A, the upper 16 bits are interpreted as the real time stamp value when the frame entered the switch. Time stamp value 520A is subtracted from value 507 by logic 520. The resultant value 513 is placed in the upper 16 bits of the EF word, as shown in FIG. 5A and data 517 with the new delta time stamp is transmitted.

Figure 5B:
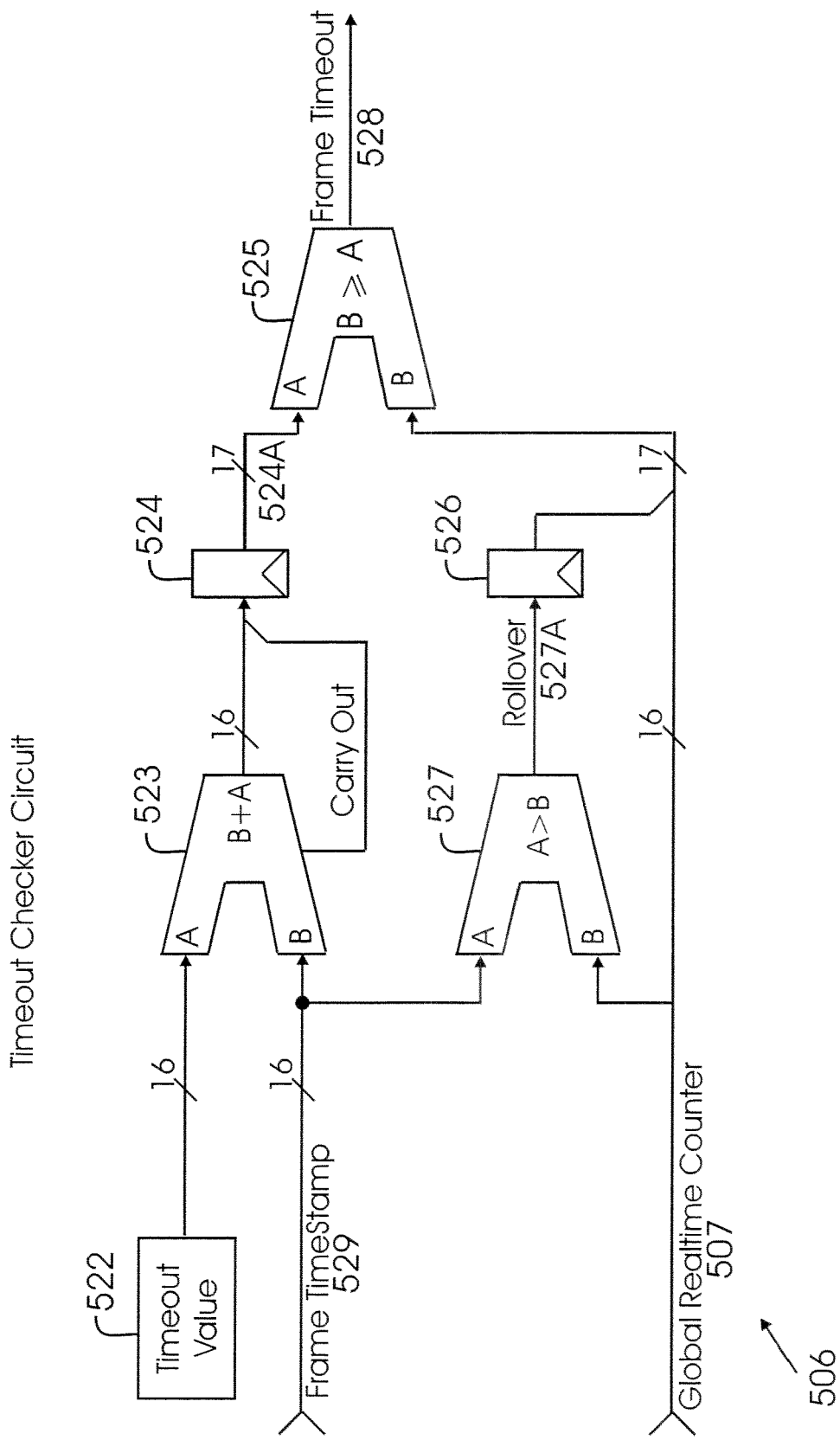
FIG. 5B shows a schematic of time out checker circuit, according to one aspect of the present invention.

Time out Checker Circuit 506:

FIG. 5B shows a schematic of time out checker circuit 506, according to one aspect of the present invention. Time out value 522 (similar to time out values 503, 503A and 504) is sent to logic 523 that also receives a frame's time stamp value 529 (similar to 501A, 511B, or 521A).

For illustration purposes only, if there are 16 frames in RBUF 69A, then 16 time stamps are multiplexed down to one time stamp at input Mux 501. A 4-bit select for Mux 501 is created by a free running counter that may be master cleared to a "0000" value and counts up at every clock. At a value of "1111", the counter resets to "0000". A new time stamp value is multiplexed in every clock and each time stamp value is seen once every $16^{th}$ clock. The selected time stamp 529 is sent to logic 523 that adds the time out value 522.

Time stamp value 529 is also sent to rollover logic 527 where the time stamp value 529 is compared to global real-time counter value 507. If the time stamp value 529 is greater than 507, a rollover value 527A is generated.

Rollover logic 527 is used to accommodate the situation where global real-time counter value 507 reaches its maximum value (for example, a maximum 16 bit value and then rolls over to zero. Since the frame time stamp is obtained from the global real-time counter value 507, the time stamp value 529 will he less than or equal to a current value of 507. The global real time counter value 507 will be less than the frame's time stamp value 529 when the counter has rolled over. Therefore, the time stamp value 529 is compared with value 507 by logic 527 for as long as a frame remains in TBUF 70A. If logic 527 detects a counter rollover situation, then the rollover state is captured and held by module 526. This affects a frame time out comparison that is performed by logic 525 and generates frame time out signal 528 that indicates if a frame has timed out.

Logic 525 compares value 507 and frame time out value 524A. Time out value 524A is a sum of time out value 522 and frame time stamp 520. In one example, if both 522 and 529 are 16-bit values, then the sum will create a 17-bit value (524A). In order to compare this 17-bit sum with value 507, another bit is concatenated. The rollover state described above is used as the most significant bit with value 507. This represents the 17$^{th}$ bit in a 17-bit value derived from a 16-bit counter.

The foregoing example is only to illustrate the adaptive aspects of the present invention and not to limit the invention to any particular counter size, or a particular bit size for the various inputs (for example, 522 and 529).

Figure 6:
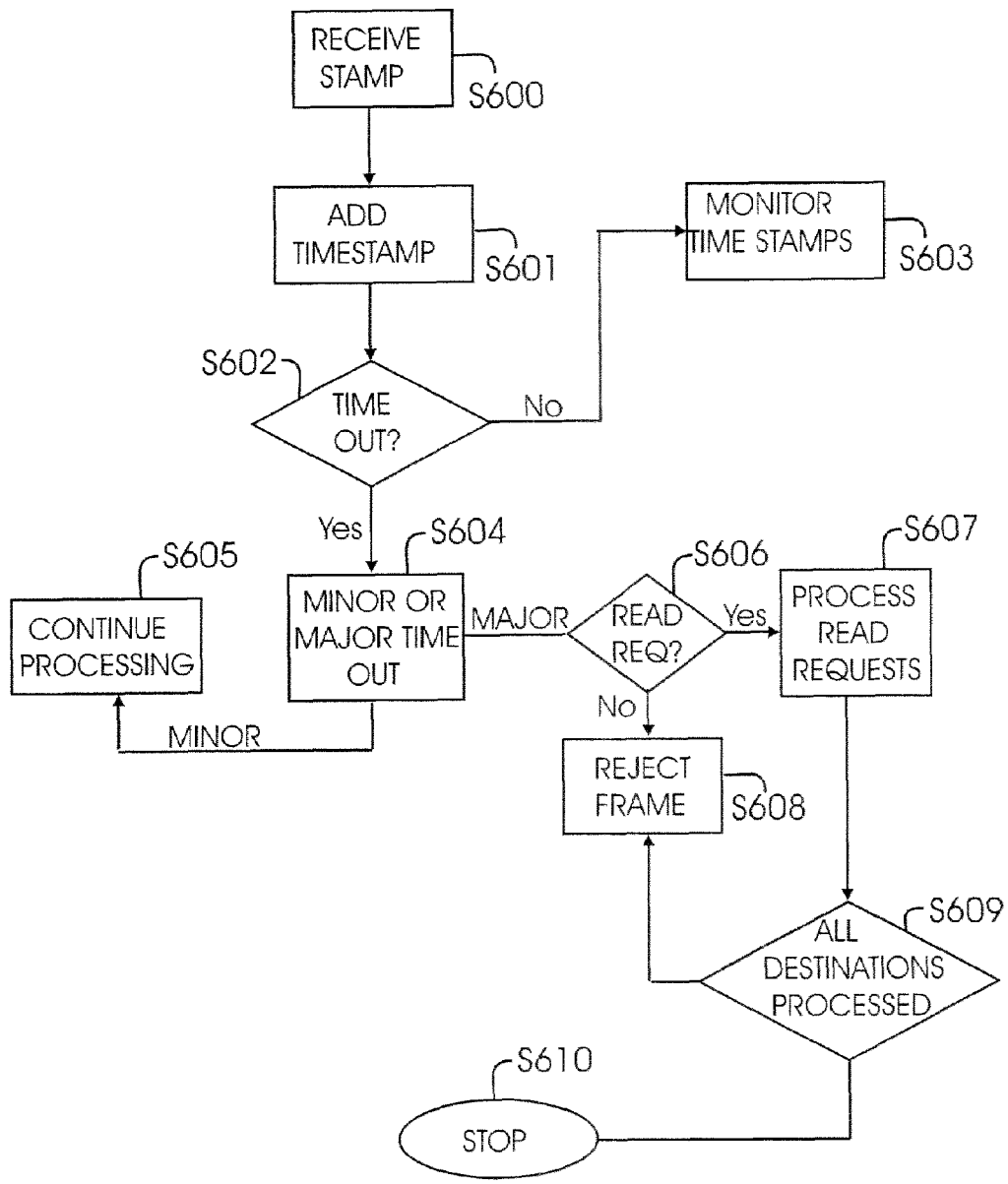
FIG. 6 shows a flow diagram for managing frame time outs and reducing congestion, according to one aspect of the present invention.

FIG. 6 shows a flow diagram for managing frame time outs and reducing congestion, according to one aspect of the present invention.

In step S600, frame data (500/508 for RPORT segment and 500B/512A for TPORT segment) is received.

In step S601, a time stamp (501A and 511B) based on global real time counter value 507 (also referred to herein as value 507) is inserted in EOF 509. If a delta time value is present, then the frame time stamp value is subtracted from value 507 and the resultant value (510A) replaces the delta time value in frame 508 when the frame moves from RPORT 310A to TPORT 312A.

In step S602, the process determines if a time out has occurred. This is performed by time out checker circuit 506, that has been described above with respect to FIGS. 5A and 5B. If a time out has not occurred, then time out state machine 502, in step S603, continues to monitor RBUF 69A or TBUF 70A depending upon the location of the frame.

In step S604, the process determines if the time out is minor or major. If the time out is minor, then in step S605, the frame processing continues and a flag is set.

If the time out is major, then in step S606, the process determines if there are any read requests in process (or pending read requests). If there are read requests in process/pending, then in step S607, those read requests are completed.

In step S609, the process determines if all destinations have been processed. If yes, then the process stops in step S610. If all destinations have not been processed, then the process moves to step S608.

If there are no read requests, then in step S608, the frames are rejected, based on a programmable policy or otherwise.

In one aspect of the present invention, the delta time feature allows for accurate timing of frames without the need to synchronize timers or counters on both sides of the FC links.

It is noteworthy that the present invention provides end to end frame timing (i.e. from the time a frame enters a fabric to the time the frame leaves the fabric) without a requirement for synchronizing time between individual switch elements.

In one aspect of the present invention, overall congestion is reduced because frames time out can be monitored and frames that are stalled can be removed.

Although the present invention has been described with reference to specific embodiments, these embodiments are illustrative only and not limiting. Many other applications and embodiments of the present invention will be apparent in light of this disclosure and the following claims.

What is claimed is:

1. A time out checker circuit for determining whether a frame timeout has occurred, the circuit comprising:

first logic for receiving at inputs a timeout value and a frame time stamp value, summing the inputs, and generating as an output a frame timeout value, which is equal to the sum of the input;

second logic for receiving as inputs the frame time stamp value and a global real-time counter value, comparing, the inputs, and, if the frame time stamp value is greater than the global real-time counter value, generating as an output a rollover value, which indicates that the global real-time counter value has rolled over from its maximum value to zero; and third logic for receiving as inputs the global real-time counter value and the frame timeout value, comparing the inputs, and, if the global real-time counter value is greater than or equal to the frame timeout value, generating as an output a frame timeout signal indicating that a frame has timed out.

2. The time out checker circuit or claim 1, wherein the timeout value is programmed.

3. The time out checker circuit of claim 1, wherein the frame time stamp value is based on the global real-time counter value.

4. The time out checker circuit of claim 1, wherein the frame time stamp value is always less than or equal to the global real-time counter value, except when the global real-time counter value has rolled over from its maximum value to zero.

5. The time out checker circuit of claim 1, further comprising a module for holding a rollover state and providing the rollover state to the third logic.

6. A method of determining whether a frame timeout has occurred using a time out checker circuit, the method comprising:

first logic of the time out checker circuit receiving as inputs a timeout value and a frame time stump value, summing the inputs, and generating as an output a frame timeout value, which is equal to the sum of the inputs;

second logic of the time out checker circuit receiving as inputs the frame time stamp value and a global real-time counter value, comparing the inputs, and, if the frame time stamp value is greater than the global real-time counter value, generating as an output a rollover value, which indicates that the global real-time counter value has rolled over from its maximum value to zero; and third logic o the time out checker circuit receiving as inputs the global real-time counter value and the frame timeout value, comparing the inputs, and, if the global real-time counter value is greater than or equal to the frame timeout value, generating as an output a frame timeout signal indicating that a frame has timeout.

7. The method of claim 6, further comprising programming the timeout value.

8. The method of claim 6, wherein the frame time stamp value is based on the global real-time counter value.

9. The method of claim 6 wherein the frame time stamp value is always less than or equal to the global real-time counter value, except when the global real-time counter value has rolled over from its maximum value to zero.

10. The method of claim 6, further comprising a module for holding a rollover state and providing the rollover state to the third logic.

11. The method of claim 10, wherein if the timeout value and the frame time stamp value are both values having x bits, the sum of the timeout value and the frame time stamp value has x+1 bits, and another bit is concatenated with the global real-time counter value so that it also has x+1 bits.

12. The method of claim 11, wherein the rollover state is used as the most significant bit in the concatenated global real-time counter value.

* * * * *

UNITED STATES PATENT AND TRADEMARK OFFICE
CERTIFICATE OF CORRECTION

PATENT NO. : 7,649,903 B2
APPLICATION NO. : 12/189497
DATED : January 19, 2010
INVENTOR(S) : Frank R. Dropps et al.

It is certified that error appears in the above-identified patent and that said Letters Patent is hereby corrected as shown below:

On the first page, in field (57), in column 2, in "Abstract", line 1, delete "fiber" and insert -- fibre --, therefor.

On the first page, in field (57), in column 2, in "Abstract", line 2, delete "fiber" and insert -- fibre --, therefor.

On the first page, in field (57), in column 2, in "Abstract", line 3, delete "fiber" and insert -- fibre --, therefor.

On the first page, in field (57), in column 2, in "Abstract", line 12, delete "fiber" and insert -- fibre --, therefor.

On the first page, in field (57), in column 2, in "Abstract", line 14, delete "fiber" and insert -- fibre --, therefor.

In column 3, line 44, after "drawings" insert -- . --.

In column 4, line 19, after "Definitions" insert -- : --.

In column 4, line 25, after "while" insert -- the --.

In column 6, line 45, delete "CL" and insert -- GL -, therefor.

In column 7, line 44, delete "(RRD","" and insert -- ("RRD") --, therefor.

In column 7, line 59, delete "(SSM,"" and insert -- (SSM) --, therefor.

In column 10, line 62, delete "competed." and insert -- completed. --, therefor.

In column 11, line 9, delete "(OLA)" and insert -- (501A) --, therefor.

Signed and Sealed this

Twenty-sixth Day of October, 2010

David J. Kappos
*Director of the United States Patent and Trademark Office*

CERTIFICATE OF CORRECTION (continued)
U.S. Pat. No. 7,649,903 B2

In column 11, line 18, delete "RB F" and insert -- RBUF --, therefor.

In column 11, line 47, delete "TEBU" and insert -- TBUF --, therefor.

In column 12, line 15, after "312A." delete "in" and insert -- In --, therefor.

In column 12, line 17, after "508" insert -- ( --.

In column 12, line 20, delete "PBUF" and insert -- RBUF --, therefor.

In column 12, line 31-39, delete "In the second mode if signal 518 is active, then the upper 16 bits of the standard EOF are replaced by a delta time value. When the frame 512A arrives at TPORT 312A, the upper 16 bits are interpreted as the real time stamp value when the frame entered the switch. Time stamp value 520A is subtracted from value 507 by logic 520. The resultant value 513 is placed in the upper 16 bits of the EF word, as shown in FIG. 5A and data 517 with the new delta time stamp is transmitted." and insert the same on Col. 12, Line 32 as a new paragraph.

In column 12, line 61, after "value" insert -- ) --.

In column 12, line 64, delete "he" and insert -- be --, therefor.

In column 13, line 9, delete "520." and insert -- 529. --, therefor.

In column 14, line 1, in claim 1, delete "at" and insert -- as --, therefor.

In column 14, line 6, in claim 1, after "comparing" delete ",".

In column 14, line 20, in claim 2, delete "or" and insert -- of --, therefor.

In column 14, line 49, in claim 6, after "logic" delete "o" and insert -- of --, therefor.

In column 14, line 55, in claim 6, delete "timeout" and insert -- timed out --, therefor.